United States Patent [19]
Kazmaier et al.

[11] Patent Number: 5,723,511
[45] Date of Patent: Mar. 3, 1998

[54] PROCESSES FOR PREPARING TELECHELIC, BRANCHED AND STAR THERMOPLASTIC RESIN POLYMERS

[75] Inventors: Peter M. Kazmaier, Mississauga; Barkev Keoshkerian, Thornhill; Karen A. Moffat, Brantford; Michael K. Georges, Guelph; Gordon K. Hamer; Richard P. N. Veregin, both of Mississauga, all of Canada

[73] Assignee: Xerox Corporation, Stamford, Conn.

[21] Appl. No.: 664,702

[22] Filed: Jun. 17, 1996

[51] Int. Cl.$^6$ .......................... C08F 2/50; C08F 257/02; C08F 265/06; C08F 287/00
[52] U.S. Cl. .................. 522/35; 522/60; 522/62; 522/57; 522/149; 522/904; 522/175; 522/182; 522/188; 522/63; 522/65; 522/36; 525/88; 525/95; 525/901; 525/941; 526/328; 526/328.5; 526/329; 526/329.2
[58] Field of Search .................. 522/36, 35, 904, 522/57, 63, 60, 65, 62, 149, 175, 182, 188; 525/88, 95, 901, 941; 526/328, 328.5, 329, 329.2

[56] References Cited

U.S. PATENT DOCUMENTS

| | | | |
|---|---|---|---|
| 4,518,794 | 5/1985 | Boutevin et al. | 522/179 |
| 4,546,160 | 10/1985 | Brand et al. | 526/320 |
| 4,581,429 | 4/1986 | Solomon et al. | 526/220 |
| 4,736,004 | 4/1988 | Scherer, Jr. et al. | 526/206 |
| 5,017,458 | 5/1991 | Soda et al. | 430/296 |
| 5,059,657 | 10/1991 | Druliner et al. | 525/244 |
| 5,180,756 | 1/1993 | Rehmer et al. | 522/35 |
| 5,268,437 | 12/1993 | Holy et al. | 526/299 |
| 5,334,756 | 8/1994 | Likibi et al. | 562/565 |
| 5,412,047 | 5/1995 | Georges et al. | 526/204 |
| 5,473,031 | 12/1995 | Tinetti et al. | 526/273 |
| 5,552,502 | 9/1996 | Odell et al. | 526/234 |

*Primary Examiner*—Susan W. Berman
*Attorney, Agent, or Firm*—John L. Haack

[57] ABSTRACT

A process for the preparation of branched thermoplastic resins comprising: heating a mixture of a free radical initiator, at least one first free radical reactive monomer, at least one free radical reactive branching agent compound, and at least one stable free radical agent, to produce a linear or unbranched polymer product with a free radical initator fragment at one end and a covalently bonded stable free radical agent at the other end of the polymerized chain of monomers; and irradiating the unbranched polymer product in the presence of a reactive compound selected from the group consisting of a free radical reactive monomer, a branching agent compound, and mixtures thereof to form a branched polymeric product.

18 Claims, 2 Drawing Sheets

PROCESSES FOR PREPARING TELECHELIC, BRANCHED AND STAR THERMOPLASTIC RESIN POLYMERS

REFERENCE TO COPENDING AND ISSUED PATENTS

Attention is directed to commonly owned and assigned U.S. Pat. No. 5,322,912, issued Jun. 21, 1994, entitled "POLYMERIZATION PROCESSES AND THEIR TONER COMPOSITIONS THEREFROM", wherein there is disclosed free radical polymerization processes for the preparation of a thermoplastic resin or resins comprising: heating from about 100° C. to about 160° C. a mixture comprised of a free radical initiator, a stable free radical agent, and at least one polymerizable monomer compound to form the thermoplastic resin or resins with a high monomer to polymer conversion and a narrow polydispersity; U.S. Pat. No. 5,412,047, issued May 2, 1995, entitled "HOMOPOLYMERIZATION PROCESSES WITH OXONITROXIDES", wherein there is illustrated stable free radical moderated polymerization processes which employ an oxo nitroxide compound which enable the controlled homopolymerization of acrylate and related monomer compounds; U.S. Pat. No. 5,401,804, issued Mar. 28, 1995, which is a divisional application of U.S. Pat. No. 5,322,912, entitled "POLYMERIZATION PROCESS AND TONER COMPOSITIONS THEREFROM"; U.S. Pat. No. 5,449,724, issued Sep. 12, 1995, entitled "STABLE FREE RADICAL POLYMERIZATION PROCESS AND THERMOPLASTIC MATERIALS PRODUCED THEREFROM", which discloses high pressure stable free radical polymerization processes for preparing, for example, polyethylene rubbers; U.S. Pat. No. 5,312,704, issued May 17, 1994, entitled "MONOMODAL, MONODISPERSED TONER COMPOSITIONS AND IMAGING PROCESSES", wherein there is illustrated a toner composition comprised of pigment particles, and a resin prepared by anionic means comprised of a monomodal polymer resin or monomodal polymer resin blends and wherein the monomodal resin or resin blends possess a narrow polydispersity; and U.S. Pat. No. 5,498,679, U.S. Pat. No. 5,498,679 entitled "PROCESS FOR PRODUCING BRANCHED AND STAR THERMOPLASTIC RESIN POLYMERS", wherein there is disclosed a free radical polymerization process for the preparation of a thermoplastic resin or resins, comprising: heating a mixture of a multifunctional nitroxide compound and at least one polymerizable monomer compound to form the thermoplastic resin or resins; cooling the mixture; optionally isolating the thermoplastic resin; and optionally washing and drying the thermoplastic resin; wherein the multifunctional nitroxide compound is formed from a stable free radical agent and a compound having one or more halide functional groups, and wherein the free radical polymerization process may be used to prepare telechelic, branched and star polymers.

Attention is directed to commonly owned and assigned copending applications Application Numbers, U.S. Pat. No. 5,549,998 filed Dec. 23, 1994, a divisional application of U.S. Pat. Nos. 5,322,912 and 5,401,804, entitled "POLYMERIZATION PROCESSES AND TONER COMPOSITIONS THEREFROM"; U.S. Ser. No. 08/307,192, filed Mar. 25, 1993, entitled "SEMISUSPENSION POLYMERIZATION PROCESSES", now abandoned; U.S. Ser. No. 08/214,518, filed Mar. 18, 1994, entitled "EMULSION POLYMERIZATION PROCESSES AND TONER COMPOSITIONS THEREFROM", a continuation-in-part of U.S. Pat. No. 5,322,912, filed Nov. 16, 1992; U.S. Ser. No. 08/223,418, filed Apr. 4, 1994, entitled "AQUEOUS POLYMERIZATION PROCESSES"; U.S. Ser. No. 08/292,670, filed Aug. 18, 1994, entitled "BIFUNCTIONAL MACROMOLECULES AND TONER COMPOSITIONS THEREFROM"; U.S. Pat. No. 5,545,504, filed Oct. 3, 1994, entitled "INK JETTABLE TONER COMPOSITIONS AND PROCESSES FOR MAKING AND USING"; U.S. Ser. No. 08/345,371, filed Nov. 18, 1994, entitled "POLYMERIZATION PROCESSES"; U.S. Ser. No. 08/348,022, filed Dec. 1, 1994, entitled "POLYMERIZATION MULTIBLOCK COPOLYMER PROCESS AND COMPOSITIONS THEREOF"; U.S. Ser. No. 08/348,021, filed Dec. 12, 1994, entitled "POLYMERIZATION PROCESS AND COMPOSITIONS THEREOF"; U.S. Pat. No. 5,530,079 filed Jan. 3, 1995, entitled "POLYMERIZATION PROCESSES"; U.S. Pat. No. 5,608,023, filed Mar. 30, 1995, entitled "RATE ENHANCED POLYMERIZATIONS"; U.S. Ser. No. 08/413,752, filed Mar. 30, 1995, entitled "STABLE FREE RADICAL POLYMERIZATION UNDER SUPERCRITICAL CONDITIONS AND POLYMERS PRODUCED THEREBY"; U.S. Ser. No. 08/413,645, filed Mar. 30, 1995, entitled "PROCESSES FOR THE PREPARATION OF BRANCHED POLYMERS"; wherein there is disclosed a process for the preparation of branched thermoplastic resins comprising heating a mixture of an unsaturated resin, a free radical initiator, and a stable free radical agent; adding to the heated mixture at least one polymerizable branching agent; and cooling the mixture, wherein the resulting product is a branched thermoplastic resin with arms or branches comprised of polymerized monomer with substantially uniform length and narrow polydispersity; U.S. Ser. No. 08/700,328 (D/95598), filed Aug. 8, 1996, entitled "STABLE FREE RADICAL POLYMERIZATION PROCESSES AND COMPOSITIONS THEREOF"; U.S. Ser. No. 08/553,200, filed Nov. 7, 1995, entitled "POLYMERIZATION PROCESSES"; and U.S. Pat. No. 5,552,502, filed Nov. 10, 1995, entitled "POLYMERIZATION PROCESSE" and compositions thereof.

The disclosures of each the above mentioned patents and copending applications are incorporated herein by reference in their entirety.

BACKGROUND OF THE INVENTION

The present invention is generally directed to processes for the preparation of branched or dendrimeric homopolymers and copolymers. More specifically, the present invention relates to improved polymerization processes which provide branched, star, and dendrimeric homopolymer and copolymer resin products which possess narrow polydispersity properties and which polymerization processes proceed with high monomer to polymer conversion. In particular, this invention relates to stable free radical mediated, pseudo-living polymerization processes which yield branched homopolymers and copolymers having number average molecular weights (Mn) above about 100 to about 200,000 and having a polydispersity ratio of the weight average molecular weight (Mw) to the number average molecular weight (Mn) of from about 1.0 to about 2.0 and which processes accomplished in accordance with the present invention provide numerous operational and economic advantages.

This invention relates to polymers with controlled narrow molecular weight distributions, and a polymerization process for producing such compositions. More specifically, the present invention relates to telechelic, branched and star polymers, and a process for preparing the polymers using an initiator/capping reagent to initiate the polymerization reaction and reversibly cap the propagating chain. This invention also relates to a method for preparing the initiator/capping reagent and thereafter conducting the polymerization process either with or without isolating the reagent. The process is particularly useful in the production of thermoplastic polymer resins for use in a wide variety of thermoplastic applications.

The present invention provides in embodiments a pseudo-living polymerization process that enables the synthesis of narrow polydispersity branched homopolymer and copolymer resins from a variety of free radical reactive monomers. The process, in embodiments, uses known free radical initiators in combination with nitroxide or non-nitroxide type stable free radical agent compounds, free radical reactive branching agent or monomers, and free radical reactive monomers to afford narrow polydispersity dendrimeric thermoplastic resins or elastomers. In other the embodiments, the present invention provides processes for preparing highly branched, linear, and star type dendrimer molecules by sequentially conducting an alternating series of stable free radical mediated polymer chain extension or growth reactions, at elevated temperatures, wherein monomer is added substantially uniformly, with respect to molecular weight of added monomers, to all of the propagating arms or branches; and chain branching reactions wherein a free radical reactive branching agent containing a photochemically labile group or groups, is introduced concurrently, for example, under thermal conditions, into the propagating polymer chain(s) thereby introducing one or more branch points in the intermediate or nescent dendrimer polymer molecule. The intermediate molecule is subsequently irradiated to activate, that is, photochemically cleave the intermediate polymer molecule selectively at those sites where the branching agent was introduced. The sequence can be repeated numerous times, for example from 1 to about 20 times, and to the extent that the preceding product polymer containing stable free radical terminal functional groups is capable of being thermally activated or otherwise further reacted to provide further chain branching or chain extension propagation.

Many polymerization processes used for the synthesis of narrow polydispersity resins, such as anionic, cationic, and group transfer polymerization processes, are severely limited by the need for anhydrous reaction conditions and monomers which do not contain protic or reactive functional groups, for example, hydroxy (OH) carboxy ($CO_2H$), amino (NH), and the like. As a consequence, these processes are not readily applicable to the polymerization of functionalized monomers since these monomer materials tend to be hydroscopic and any associated water may readily destroy the polymerization initiator component, for example, the hydrolysis or protonation of organolithium reagents by the monomer in anionic polymerization processes, or in other ways cause the polymerization to fail entirely or to be industrially inefficient.

It is generally accepted that known anionic and cationic polymerization processes used for the preparation of branched or dendrimeric narrow polydispersity resins, block and multiblock polymers are not believed possible in aqueous or protic solvent containing polymerization media, or the aforementioned protonic or reactive so functional groups, reference commonly assigned U.S. Pat. No. 5,312, 704.

Of the known polymerization processes a preferred way to prepare branched or dendrimer polymers or copolymers having a narrow molecular weight distribution or polydispersity is by anionic processes. The use and availability of branched or star type resins having narrow polydispersities in industrial applications is limited because anionic polymerization processes must be performed in the absence of atmospheric oxygen and moisture, require difficult to handle and hazardous initiator reagents, and consequently such polymerization processes are generally limited to small batch reactors. In addition, the monomers and solvents that are used must be of high purity and anhydrous thereby rendering the anionic process more expensive than alternatives which do not have these requirements. Thus, anionic polymerization processes for the preparation of branched or star type polymers are difficult and costly.

It is desirable to have free radical polymerization process that provides narrow molecular weight distribution branched or star type polymers and resins that overcomes the shortcomings and disadvantages of the aforementioned related anionic branching polymerization processes.

Similarly, group transfer polymerization (GTP) processes have limitations and disadvantages, such as anhydrous reaction conditions and expensive reagents, which disadvantage GTP processes particularly for large scale industrial preparation of branched or star polymers.

Free radical polymerization processes are generally chemically less sensitive than anionic processes to impurities in the monomers or solvents typically used and are substantially or completely insensitive to water. Conventional free radical polymerization processes that are used to polymerize monomers in general, and functionalized monomers in particular, inherently give broad polydispersity resin products or require that sophisticated processing conditions and materials handling protocols be employed.

Star polymers or dendrimers can be constructed with, for example, a rod-like tertiary structure or a spherical tertiary structure. The branching associated with these systems provide a number of unusual properties. For example, in contrast to linear polymers, the viscosity of spherical star polymers decrease as the molecular weight increases. Furthermore, compounding hydrocarbon dendrimers in a variety of media imparts increased strength to these materials.

For example, E. L. Hillier, U.S. Pat. No. 4,048,254, has described the improvement of thermoplastic resins by blending in polystyrene star polymers. T. E. Kiovsky, U.S. Pat. No. 4,077,893, has described the use of star polymers for improving the viscosity index of lubricating oils. Kiovsky has also described the use of these materials as a dispersant. W. R. Haaf et al., U.S. Pat. No. 4,373,055, has shown that the impact strength of polyphenylene ether resins can be improved by the addition of hydrocarbon star polymers while other similar applications have also been described by M. H. Lehr, U.S. Pat. No. 4,181,644, W. P. Gergen et al., U.S. Pat. No. 4,242,470, and A. Aoki et al., U.S. Pat. No. 4,304,881. Other illustrative examples of star polymers and their properties are disclosed in H. Eschway, M. L. Hallensleben, and W. Burchard, Makromolek. Chem., 173, 235 (1973), and D. A. Tomalia, A. M. Naylor, and W. A. Goddard III, in Angew. Chem. Int. Ed. Engl., 29, 138 (1990).

In commonly owned and assigned U.S. Pat. Nos. 5,098, 475 and 5,120,361, there are illustrated inks with dendrimers, and more specifically, in U.S. Pat. No. 5,098, 475, the disclosures of which are totally incorporated herein by reference, there is disclosed an ink composition which comprises an aqueous liquid vehicle and a colored dendrimer, or dendricolorant obtained by attaching a reactive dye or dyes to commercially available amino terminated dendrimers, that is for example a dendrimer having an amine group such as $NH_2$ attached to the end of the arm farthest removed in distance from the core, which dendrimers can be of the first, second, third, or n-th generation, wherein n is a number of preferably less than 9, and more specifically is a number of from about 1 to about 8, and wherein the attachment reaction can be accomplished at room temperature in water.

Branched copolymers prepared by conventional free radical polymerization processes inherently have broad molecular weight distributions or polydispersities, generally greater than about four. One reason is that most free radical initiators selected have half lives that are relatively long, from several minutes to many hours, and thus the polymeric chains are not all initiated at the same time and which initiators provide growing chains of various lengths at any time during the polymerization process. Another reason is that the propagating chains in a free radical process can react with each other in processes known as coupling and disproportionation, both of which are chain terminating and polydispersity broadening reaction processes. In doing so, chains of varying lengths are terminated at different times during the reaction process which results in branched resins comprised of polymeric chains which vary widely in length from very small to very large and thus have broad polydispersities. If a free radical polymerization process is to be enabled for producing branched, dendrimeric, or star polymers with narrow molecular weight distributions, then all polymer chains and branches or arms must be initiated at about the same time and premature termination by coupling or disproportionation processes must be avoided or eliminated.

Practitioners in the art have long sought an inexpensive, efficient and environmentally efficacious means for producing branched polymers having operator controllable or selectable molecular weight and branching properties, and further, processes which selectively afford a wide variety of different polymer product types and have narrow molecular weight distribution properties.

In the aforementioned U.S. Pat. No. 5,322,912 there is disclosed free radical polymerization processes for the preparation of a thermoplastic resin or resins comprising: heating from about 100° to about 160° C. a mixture comprised of a free radical initiator, a stable free radical agent, and at least one polymerizable monomer compound to form the thermoplastic resin or resins with a high monomer to polymer conversion and a narrow polydispersity. A broad spectrum of free radical reactive monomers are suitable for use in the highly versatile polymerization process. While a variety of homopolymers and copolymers, including block and multiblock copolymers, could be prepared with high conversions and narrow polydispersities, no mention was made or suggested to include a photoactivatable or photolabile branching agent in the polymerization process to prepare branched, star, or dendrimeric polymer resins.

The following documents are of interest.

A publication by C. Hawker in *Angew. Chem. Int. Ed. Engl.*, 1995, 34, No. 13/14 pages 1456–1459 discloses the preparation of star and graft polymers by either copolymerizing stable free radical containing monomers into a polymer back bone (grafting method) or polymerizing free radical reactive monomers with a multifuntional initiator compound which has the free radical reactive sites masked by covalently and thermally cleavable stable free radical compounds, such as TEMPO. The publication does not disclose methods for producing highly branched polymeric materials, for example, employing a combination of introducing latent branching points in the polymer using polymerization or copolymerization of a branching monomer or monomers, generating and trapping the branch points by photochemical means, and thereafter extending the branched polymer at the branch point(s) using stable free radical mediated polymerization methods.

U.S. Pat. No. 5,473,031, issued Dec. 5, 1995, to Tinetti et al., discloses a process for preparing a branched polymer from a vinyl aromatic monomer comprising, copolymerizing the vinyl aromatic monomer with a monomer pair, wherein the monomer pair consists of two different monomers containing functionalities which are substantially nonreactive with each other under the conditions of copolymerization, and heating the copolymer produced to a temperature such that the functionalities react with each other to form branches with the polymer.

U.S. Pat. No. 5,017,458, issued May 21, 1991, to Soda et al., discloses a method for producing a graft copolymer including the steps of adding to a base polymer capable of forming first radicals when irradiated with radiation an additive capable of combining with the first radicals to form second radicals stable against oxygen, the step of irradiating the base polymer containing the additive with radiation, and the step of introducing a monomer under an atmosphere free from oxygen, thereby to graft copolymerize the irradiated base polymer and the monomer.

U.S. Pat. No. 5,334,756, issued Aug. 2, 1994, to Likibi et al., discloses a process for preparing carboxylates of polyoxyalkylene siloxanes and amines, alkylpolyoxyalkylenes, polyoxyalkylene block polymers, and the like materials, comprising subjecting a primary hyroxyl group-containing polyoxyalkylene compound or alkylpolyglucoside to mild oxidiation.

In European Patent Publication 349,270 B1, filed Jun. 6, 1988 (US), is disclosed a pressure-sensitive adhesive composition characterized by: a block copolymer represented by the general formula I(BAT)$_n$ wherein I represents the free radical initiator portion of an iniferter of the formula I(T)$_n$; T represents the termination portion of the iniferter; n is an integer of at least 2; and B represents an elastic acrylic polymer block having a glass transition temperature of at least 30° C. and an A-block is formed of a monomer selected from the group consisting of methyl methacrylate, polystyrylethyl methacrylate, macromer, methyl methacrylate macromer, acrylic acid, acrylonitrile, isobornyl methacrylate, N-vinyl pyrrolidone, and mixtures thereof, the weight ratio of the B-block to the A-block in the block copolymer being from 95:5 to 50:50; and 0 to 150 parts by weight tackifier per 100 parts block copolymer. Also disclosed is a method of making the pressure sensitive adhesive which relies upon mixing and exposing an iniferter of the formula I(T)$_n$ to an energy source in the presence of a sequence of monomer charges.

U.S. Pat. No. 4,581,429 to Solomon et al., issued Apr. 8, 1986, discloses a free radical polymerization process which controls the growth of polymer chains to produce short chain or oligomeric homopolymers and copolymers including block and graft copolymers. The process employs an initiator having the formula (in part)=N—O—X, where X is a free radical species capable of polymerizing unsaturated monomers. The molecular weights of the polymer products obtained are generally from about 2,500 to 7,000 having polydispersities generally of about 1.4 to 1.8, at low monomer to polymer conversion. The reactions typically have low conversion rates and use relatively low reaction temperatures of less than about 100° C., and use multiple stages.

European Patent Publication No. 0135280 corresponding to European Patent Application No. EP 84 304,756 is the European Patent Office equivalent of the aforementioned U.S. Pat. No. 4,581,429.

In Polymer Preprints, 35 (1), 778 (1994), Matyjaszewski et al., is disclosed so thermal polymerizations of styrene monomers in the presence of stable radicals and inhibitors, but without a free radical initiator present, such as peroxide or azo compounds.

In the Journal of the American Chemical Society, 1994, 116, p. 11185-11186, is disclosed free radical polymerization processes for the preparation of narrow polydispersity polymers, such as polystyrene, and block copolymers, such as poly(styrene-b-acetoxymethyl styrene), using a free radical initiator, such as benzoyl peroxide, a stable free radical compound such as TEMPO, and a monomer, in accordance with the prior teachings of Georges et al., Macromolecules, 1993, p. 26, 2987, which prior teaching is based on the aforementioned commonly assigned U.S. Pat. No. 5,322,912.

In U.S. Pat. No. 5,268,437, to Holy, issued Dec. 7, 1993, discloses a high temperature aqueous processes for the polymerization of monoethylenically unsaturated carboxylic monomer to produce low molecular weight, water-soluble polymer products useful as detergent additives, scale inhibitors, dispersants and crystal growth modifies. Suitable monomers include acrylic acid, methacrylic acid, maleic acid, maleic anhydride, crotonic acid, and itaconic acid. The reactions are run at temperatures ranging from about 130° to 240° C., preferably from about 140° to about 230° C., with polydispersities less than 2.5. The process can be continuous, semicontinuous, or batch.

In U.S. Pat. No. 4,546,160, to Brand et al., issued Oct. 8, 1985, is disclosed a process to continuously bulk polymerize acrylic monomers to prepare low molecular weight, uniform polymers employing minor amounts of initiator and, optionally solvents, at short residence times and moderate reaction temperatures to provide high yields of a product with polydispersities less than 3, suitable for high solids applications.

U.S. Pat. No. 5,059,657 to Druliner et al., issued Oct. 22, 1991, discloses a polymerization process for acrylic and maleimide monomers by contacting the monomers with a diazotate, cyanate or hyponitrite, and N-chlorosuccinimide, N-bromosuccinimide or a diazonium salt. The polymer produced can initiate further polymerization, including use in block copolymer formation.

U.S. Pat. No. 4,736,004 to Scherer, Jr. et al., issued Apr. 5, 1988, discloses novel persistent perfluorinated free radicals which, upon thermal decomposition, yield free radical species which can be used to polymerize polymerizable monomers containing ethylenic unsaturation.

U.S. Pat. No. 3,600,169 to Lawton, issued Aug. 17, 1971, discloses an electrostatic light sensitive reproduction sheet employing a composition comprising in an insulating resinous binder an organic stable free radical and a precursor sensitive to light to be converted to transient free radicals that are reactive with the stable free radical and to change the conductance of the sheet so that an electrostatic image can be formed. Also disclosed is an extensive listing of stable free radical compounds.

Other references cited in an international search report for the aforementioned commonly owned U.S. Pat. No. 5,322,912 are: J. Am. Chem. Soc., 1983, 5706–5708; Macromol., 1987, 1473–1488; Macromol., 1991, 6572–6577; U.S. Pat. No. 4,628,019 to Suematsu et al., issued Aug. 10, 1986; U.S. Pat. No. 3,947,078 to Crystal, issued Aug. 10, 1976; and U.S. Pat. No. 3,965,021 to Clemens et al., issued Jun. 22, 1976. The cited references disclose alternative means, as discussed above, such as anionic, group transfer, and the like, for preparing polymer resins, and in some instances branched or star type polymers, with narrow polydispersity properties, but which alternative means do not provide the convenience and economic advantages of the present invention.

The following references are also of interest: U.S. Pat. Nos. 3,682,875; 3,879,360; 3,954,722; 4,201,848; 4,542,182; 4,581,429; 4,777,230; 5,059,657; 5,173,551; 5,191,008; 5,191,009; 5,194,496; 5,216,096; and 5,247,024.

The aforementioned references are incorporated in their entirety by reference herein.

In free radical polymerization reaction processes of the prior art, various significant problems exist, for example difficulties in predicting or controlling both the polydispersity and modality of the polymers produced. These polymerization processes produce polymers with high weight average molecular weights ($M_w$) and low number average molecular weights ($M_n$) resulting in broad polydispersities or broad molecular weight distribution ($M_w/M_n$) and in some instances low conversion. Further, polymerization processes of the prior art, in particular free radical processes, are prone to generating excessive quantities of heat since the polymerization reaction is exothermic. As the viscosity of the reaction medium increases dissipation of heat becomes more difficult. This is referred to as the Trommsdorff effect as discussed and illustrated in Principles of Polymerization, G. Odian, 2nd Ed., Wiley-Interscience, N.Y., 1981, page 272, the disclosure of which is entirely incorporated herein by reference. This is particularly the situation for reactions with high concentrations of soluble monomer, for example greater than 30 to 50 percent by weight soluble monomer, which are conducted in large scale reactors with limited surface area and limited heat dissipation capacity. Moreover, the exothermic nature of free radical polymerization processes is often a limitation that severely restricts the concentration of reactants or the reactor size upon scale up.

Further, gel body formation in conventional free radical polymerization processes may result in a broad molecular weight distributions and/or difficulties encountered during filtering, drying and manipulating the product resin, particularly for highly concentrated reactions.

Other disadvantages associated with the prior art methods for preparing branched or star type dendrimeric polymeric materials is the they typically provide products with highly variable branch length, variable branch molecular weight and polydispersities, and variable particle size, for example.

These and other disadvantages are avoided, or minimized with the branching polymerization processes of the present invention.

Thus, there remains a need for branching polymerization processes for the preparation of branched, star, and dendrimeric, narrow polydispersity, polymeric resins by economical and scalable free radical polymerization techniques and which polymers retain many or all of their desirable physical properties, for example, uniform branch or arm length and number, hardness, low gel content, processibility, clarity, high gloss durability, and the like, while avoiding the problems of non-uniform branch length or composition, gel formation, exotherms, volume limited and multi-stage reaction systems, complex purification, encumbered or compromised performance properties due to undesired residuals, broad polydispersity properties of the polymer resin products, and the like, associated with prior art free radical polymerization methodologies.

There has been a long felt need for an economical free radical polymerization processes which are suitable for preparing narrow polydispersity branched or star type resins in the presence of water or protic solvents.

There also remains a need for polymerization processes which enable the preparation of narrow polydispersity branched or dendrimeric compounds and polymers with high molecular economy and efficiency, and by providing alternative synthetic pathways, such as linear, convergent, and de novo routes, and which compounds and polymerization processes overcome the aforementioned limitations and problems.

There is a need for process methodology to generate stable free radical terminated branch sites which can be used for the purpose of subsequently growing polymeric branches of uniform molecular weight thereby structurally articulating the branches and the polymeric material, and imparting the desired preformance properties to the resulting polymeric product.

There is also a need for process methodology for preparing dendrimeric, branched, and star polymeric materials wherein the branches or arms of the product are of uniform molecular weight and length.

Processes for the preparation of the aforementioned polymeric materials are enabled, in embodiments of the present invention, by combinations of a chain elongation step, or steps, using thermally controlled stable free radical polymerization processes including, for example, copolymerizing conventional free radical reactive unsaturated monomers with greater or lesser amounts of one or more free radical reactive branching agents, and thereafter accomplishing a photochemically initiated chain branching step or steps, and a thermally or photochemically initiated branch elongation step, or steps.

The thermoplastic polymer resin compositions of the present invention may be formed into a variety of thermoplastic products, for example by known processes such as injection and blow molding processes. Other such thermoplastic products include resins for electrostatographic toner and developer compositions; narrow polydispersity polymers for applications including, but not limited to, adhesive formulations, surfactants and viscosity modifiers; and monomodal or multimodal resins for use in thermoplastic films and coating technologies.

The polymerization processes and the resultant branched, dendrimeric and star compounds, thermoplastic resins, and elastomer products of, the present invention are useful in many applications, for example, as a variety of specialty applications including toner and liquid immersion development ink resins or ink additives used for electrophotographic imaging processes, or where monomodal or mixtures of monomodal narrow molecular weight branched resins or branched block copolymers with narrow molecular weight distribution within each block component are suitable, for example, in thermoplastic films, electrophotographic marking materials such as toners and toner additives, and in aqueous or organic solvent borne coating technologies.

These and other problems have been unexpectedly solved in embodiments of the present invention wherein there are provided superior results arising from polymerization or copolymerizing, for example by heating, with an initiator compound containing at least one covalently bonded stable free radical functional group, at least one free radical polymerizable monomer, and at least one free radical reactive branching agent to form an unbranched polymeric product containing latent or incipent branching functionality; irradiating a mixture of the aforementioned unbranched polymeric product, and a second stable free radical agent to form an intermediate branched polymeric product wherein the second stable free radical agent are covalently attached to the intermediate product at sites corresponding to where the branching agents have been integrated into the polymer; and heating the resulting intermediate branched polymeric product and at least one second free radical polymerizable monomer to form a first branched polymeric product wherein the second free radical polymerizable monomer is integrated into the polymer chain at branching agent loci, and as illustrated herein.

SUMMARY OF THE INVENTION

It is an object, in embodiments, of the present invention to overcome deficiencies of prior art preparative polymerization processes for branched, star, dendrimer, and the like polymeric structures, and to provide polymerization processes with improved efficiency, improved flexibility, and improved operational economies. In embodiments, the present invention overcomes many of the problems and disadvantages of the aforementioned related art branching polymerization processes by forming narrow polydispersity branched polymedc resins and wherein high conversion from monomer to polymer is achieved, for example, and as illustrated herein.

Another object of the present invention, in embodiments, is to provide improved polymerization processes which comprise heating, with a initiator compound containing at least one covalently bonded stable free radical functional group, at least one free radical polymerizable monomer, and at least one free radical reactive branching agent to form an unbranched polymeric product containing latent or incipient branching functionality; irradiating a mixture of the aforementioned unbranched polymeric product, and a second stable free radical agent to form an intermediate branched polymeric product wherein the second stable free radical agent is covalently attached to the intermediate product at sites corresponding to where the branching agents have been previously integrated into the polymer; and heating the resulting intermediate branched polymeric product and at least one second free radical polymerizable monomer to form a first branched polymeric product wherein the second free radical polymerizable monomer is integrated into the polymer chain substantially at loci attributable to the branching agent, and as illustrated herein.

In yet another object of the present invention, in embodiments, there is provided improved processes which produce highly branched polymeric materials.

In embodiments, this invention provides a free radical polymerization process for the preparation of a thermoplastic resin or resins, comprising: heating a mixture comprising an initiator compound of the formula A-T, wherein A represents a group having at least one carbon atom and is such that a free radical A• arising therefrom is capable of polymerizing an unsaturated monomer by free radical polymerization and the free radical functionality thereof resides on the at least one carbon atom, and T is a covalently bonded stable free radical compound, at least one free radical polymerizable monomer of the formula M1, and at least one free radical reactive branching agent of the formula B, to form an unbranched polymeric product of the formula A—(M1)$_m$—(B)$_n$—T, where m and n are integers from 1 to about 10,000 representing the total number of monomers M and B contained in the unbranched product; irradiating a mixture of the unbranched polymeric product and a second stable free radical compound of the formula T to form an intermediate branched polymeric product of the formula A—(M1)$_m$—[B—(T')$_p$]$_n$—T wherein a T' is convalently bonded to at least one branching agent B, in the polymeric product, and wherein p is an integer from 1 to about 10 representing the average number of stable free radical compounds of the formula T' attached to each branching agent B in the intermediate branched polymeric product; heating a mixture of the intermediate branched polymeric product and at least one second free radical polymerizable monomer of the formula M2 to form a first branched polymeric product of the formula A—(M1)$_m$—[B—(M2)$_o$—(T')$_p$]$_n$—(M2)$_o$ —T where o is an integer from 1 to about 5,000 representing the average number of monomers M2 which are inserted between each branching agent B and the stable free radical compounds T' and T; and cooling the mixture, wherein the resulting product is a branched thermoplastic resin with arms or branches comprised of polymerized monomer with substantially uniform length and narrow polydispersity.

The stable free radical polymerization process of the present invention, in embodiments, may readily afford telechelic, branched, and star polymers having polydispersities of between about 1.1 and 2.0, and at least as low as 1.5 for various polymer systems. Stable free radical polymerization systems of the present invention afford polydispersities that are comparable to those obtained in anionic polymerizations, but avoiding the above-described shortcomings and disadvantages of the anionic polymerization processes.

An object of the present invention, in embodiments, is to provide stable free radical agent moderated polymerization processes or pseudoliving polymerization processes and branched polymers therefrom that overcome many of the problems and disadvantages of the aforementioned prior art.

In another object of the present invention, in embodiments, is provided stable free radical moderated polymerization processes for the preparation of dendrimeric, star, and branched compounds, and thermoplastic resins and elastomers thereof.

It is also an object of the present invention, in embodiments, to provide branching polymerization processes for the production of branched diblock and multiblock polymers with high monomer to polymer conversion, narrow polydispersity properties, and uniform branch or arm lengths.

It is a further object of the present invention, in embodiments, to provide branching polymerization processes which, if desired, avoid the use of water or organic solvents, or chain transfer agents as a means of controlling the molecular weight of the resulting polymers.

Another object of this invention, in embodiments, is to provide polymerization processes which result in narrow polydispersity branched thermoplastic and elastomer resin products having number average molecular weights above about 1,000.

Another object of this invention, in embodiments, is to provide branched thermoplastic resin and elastomer mixtures having number average molecular weights above about 1,000 to about 200,000, and a polydispersity within the range of from about 1.0 to about 2.0 and which polydispersities are easily selectable and controllable by an operator.

Another object of this invention, in embodiments, is to provide a branched polymer or branched polymer mixtures having sufficiently low polydispersity properties and high monomer conversions so that residual monomer levels are low and are within industrially acceptable levels so as to avoid additional monomer removal or recovery steps.

Another object of the present invention, in embodiments, is to provide branching polymerization reaction systems which affords branched narrow polydispersity homopolymeric or copolymeric thermoplastic resin products in high yield.

Another object of the present invention, in embodiments, is to provide branching polymerization reaction systems which may be conducted in the presence of a minimum amount of conventional reaction media such as water and mixtures of water and water miscible organic solvents.

In yet another object of the present invention, in embodiments, coupling or disproportionation termination reactions are substantially minimized or eliminated by reversibly terminating the propagating free radical chains or arms with one or more stable free radical agent compounds which control arm length and moderate the exothermicity and modality properties of the polymerization processes.

In another object of the present invention, in embodiments, is provided the acceleration of the dissociation of free radical peroxide initiator compounds by the addition of dissociation promoter compounds which include, for example, tertiary amines, which compounds ensure that all branched polymeric chains are initiated nearly simultaneously or at about the same time very early on in the polymerization process.

In another object of the present invention, in embodiments, is the addition of small amounts of organic or inorganic acids, for example, organic sulfonic and carboxylic acids, to the reaction medium to alter the normal rate of unsaturated polymer or unsaturated monomer reaction without significantly broadening the polydispersity of the branched polymeric resins and without inducing autopolymerization effects. Other minor additives which can have markedly beneficial effects on stable free radical mediated polymerization processes and on the branching processes of the present invention include, for example, addition of dialkyl sulfoxides promoter compounds, such as dimethyl sulfoxide (DMSO), reference commonly assigned U.S. Pat. No. 5,322,912, organic sulfonic acid ammonium salt compounds, reference the aforementioned copending application U.S. Pat. No. 5,608,023, and charge transfer compounds, reference the aforementioned copending U.S. Ser. No. 08/553,200, the disclosures of which are incorporated by reference herein in there entirety.

Still another object of the present invention, in embodiments, is to prepare water soluble branched thermoplastic resins or elastomers by single pot processes employing suitable water soluble monomer, monomers, or unsaturated polymers, free radical initiators, stable free radical compounds, branching agents, and optional minimal amounts of an emulsifier or surfactant which may provide rate enhancement or simplify isolation, but avoids emulsification or phase separation dudng the polymerization.

Another object of the present invention, in embodiments, is to prepare branched thermoplastic resins and elastomers using polymerization processes wherein the molecular weight of the growing polymer or copolymer chains, arms or branches, increase over the entire time period of the polymerization reaction, and wherein the percent conversion or degree of polymerization of monomer to polymer with respect to time or number average molecular weight is approximately linear, that is, polymerization processes which occur without the aforementioned Trommsdorff effect.

A further object of the present invention provides, in embodiments, hydrocarbon, functionalized hydrocarbon, and the like, dendrimer, star and branched polymers. The dendrimer polymers are prepared by a stable free radical mediated polymerization or addition processes wherein precise control over the length of the oligomer or polymeric arms or side chains is maintained throughout the process. This control provides substantial advantages in application areas of, for example, viscosity modification, matrix strengthening, and thermoplastic clarity improvement, since these properties depend to a substantial extent on the tertiary structure of the branched polymer, and which tertiary structure can be controlled and therefore well defined.

In still yet another object of the present invention is provided, in embodiments, branched thermoplastic polymer resins or elastomers containing a plurality of covalently bound branching agents or groups which possess high levels of photochemical activation, that is, high levels of dissociability from polymeric species under selective photochemical irradiation, and high reactivity with highly reactive or unstable free radical species such as unsaturated monomers which have reacted with a free radical initiator, and propagating polymeric free radical species.

Other objects of this invention will be apparent to those skilled in the art in light of the present disclosure and appended claims.

DETAILED DESCRIPTION OF THE INVENTION

Figure 1:
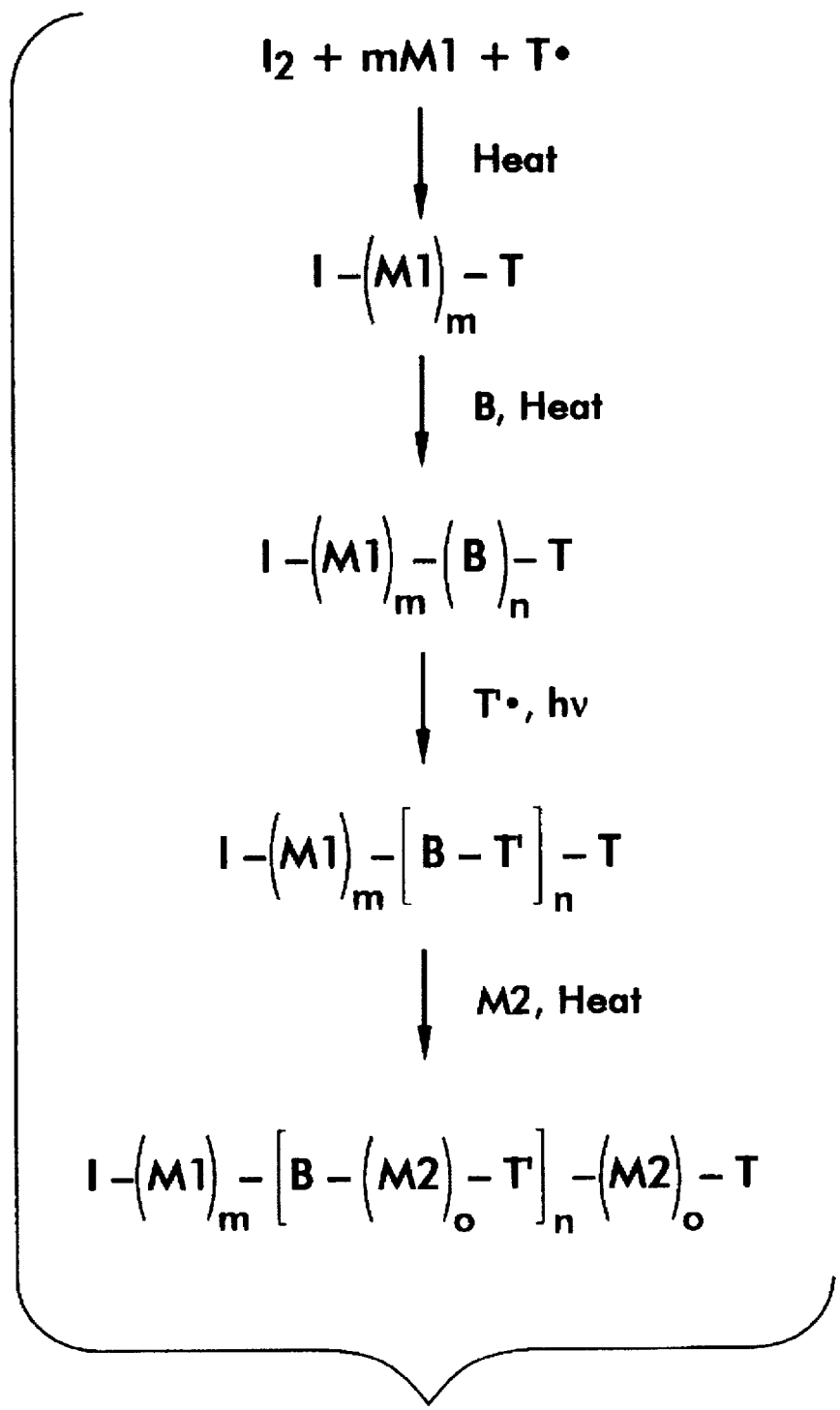
FIG. 1 is a schematic representation of an exemplary polymerization and branching sequence, in embodiments, of the present invention.

The free radical polymerization process of the present invention may be used to prepare a variety of telechelic, branched and star polymers and copolymers with a variety of molecular architectures in a cost efficient manner. An advantage of the present invention is that the stable free radical polymerization process affords precise control over the molecular architecture of the polymer, including molecular weight, molecular weight distribution, and modality.

The present invention, in embodiments, provides processes for the preparation of branched thermoplastic resins comprising: heating a mixture of a free radical initiator, at least one free radical reactive monomer, at least one free radical reactive branching agent monomer, and at least one stable free radical agent, to produce the linear or unbranched polymer product with a free radical initator fragment at one end and a covalently bonded stable free radical agent at the other end of the polymerized chain of monomers; and irradiating the unbranched polymer product in the presence of a monomer or monomers selected from the group consisting of a free radical reactive monomer, a branching agent, and mixtures thereof to form a branched polymeric product. The resulting branched polymeric product can be further elaborated with, for example, chain elongation polymerization, chain branching, and combinations thereof, as desired and in accordance with the present invention.

The branched thermoplastic resins may generally be produced, in embodiments, by the process of heating a mixture comprising an initiator compound of the formula A-T, wherein A represents a group having at least one carbon atom and is such that a free radical A• arising therefrom is capable of polymerizing an unsaturated monomer by free radical polymerization and the radical functionality resides on the at least one carbon atom, and T is a covalently bonded stable free radical compound, at least one free radical polymerizable monomer of the formula M1, and at least one free radical reactive branching agent of the formula B, to form an unbranched polymeric product of the formula $$A—(M1)_m—(B)_n—T$$

where m and n are integers from 1 to about 10,000 representing the total number of monomers M and B contained in the unbranched product; irradiating a mixture of the unbranched polymeric product $A—(M1)_m—(B)_n—T$ and a second stable free radical compound of the formula T'• to form an intermediate branched polymeric product of the formula $$A—(M1)_m—[—B—(T')_p]_n—T$$

wherein a T' is convalently bonded to at least one branching agent $(B)_n$ in the polymeric product, and wherein p is an integer from 1 to about 10 representing the average number of second stable free radical compounds of the formula T' attached to each branching agent B in the intermediate branched polymedc product; heating a mixture of the intermediate branched polymeric product and at least one second free radical polymerizable monomer of the formula M2 to form a first branched polymeric product of the formula $$A—(M1)_m—[B—(M2)_o—(T')_p]_n—(M2)o—T$$

where o is an integer from 1 to about 5,000 representing the total number of monomers M2 which are inserted between each branching agent B and the stable free radical compounds T and T'; and cooling the mixture, wherein the resulting product is a branched thermoplastic resin with arms or branches comprised of polymerized monomer with substantially uniform length and narrow polydispersity.

Polymerization processes of the present invention can, in embodiments, further comprise the branching sequence of: heating the first branched polymeric product with a second branching agent of the formula B2, to form a second intermediate product polymer of the formula $$A—(M1)_m—[B—(M2)_o—(B2)_r—T$$

wherein r is an integer from 2 to about 200 and represents the total number of second branching agent monomers B2 which are inserted between each of the covalently bonded stable free radical compounds T and T' and each corresponding branch point;

irradiating the second intermediate polymer product with at least one third stable free radical compound of the formula T"• to from a branched polymer product of the formula $$A—(M1)_m—[B—(M2)_o—[B2—(T")]_r]_n—(M2)_o[B2—(T")]_r—T$$

where T" is convalently bonded to the branching agents B2 in the resulting polymeric product; and heating the resulting branched polymeric product and at least one third free radical polymerizable monomer of the formula M3 to form a second branched polymer product of the formula $$A—(M1)_m—[B—(M2)_o—[B2—(M3—T")]_r—(T')_p]_n—(M2)_o—[B2—(M3—T")]_r—T$$

wherein the second branched polymeric product contains at least twice the number of branches as the first branched polymer product.

The aforementioned branching sequence can be repeated numerous times to produce further and more extensive branching of the branched polymer. The branching sequence can be repeated, in embodiments, for example, from 1 to about 20 times.

The branching agent monomers, in embodiments, can contain from 1 to about 10 branching sites and wherein each branching site contains a chromaphore which is photolytically active under suitable irradiation, for example, ultraviolet or UV irradiation, whereby upon irradiation, a free radical species is generated at substantially each branching site and is subsequently trapped by a stable free radical of the formula such as T• described above. In embodiments, the branching agent monomers contain at least one free radical polymerizable unsaturated double bond and at least one chromophore which is photolytically active when irradiated with a suitable radiation source whereby a free radical species generated therefrom is trapped by a stable free radical agent of the formula such as T• above. When the selected branching agent contains single chromophore which is photolabile, it is referred to as a monofunctional branching agent. Thus, in embodiments, a monofunctional branching agent monomer, in embodiments of the present invention, is incorporated into a polymer chain by, for example, stable free radical mediated polymerization processes, and is subsequently selectively photolytically cleaved in the presence additional stable free radical agent to produce a free radical species which is subsequently trapped by the stable free radical agent thereby producing a single branch point. When a plurality of monofunctional branching agents are similarly incorporated into a polymer and theroafter photolyzed and trapped, a substantially equilvalent plurality of branch points in the polymer can be established. Likewise, when a difunctional branching agent is incorporated into a polymer chain and thereafter cleaved and trapped, a bifurcated or double, that is two pronged, branch point is produced. Thus, it is readily understood by one of ordinary skill in the art that the mono-, di-, tri-, and the like, functionality of the branching agent monomer refers to both the number of photolytically cleavable sites and the number of branch points that arise from the branching agent momomer upon photolysis and trapping. A "branch" or "branching point" as used herein refers to a molecular point or loci where subsequent polymer chain extension can be achieved by applying the polymerization and branching sequence of the present invention, and as illustrated herein. Thus, in embodiments of the present invention, a monofunctional branching agent is capable of producing a single branch point and enables a single new polymer chain to be grown or propagated therefrom. A bifunctional branching agent monomer is capable of producing a double branch point and enables two new polymer chains to be grown or propagated therefrom.

Referring to the Figures, there is illustrated in FIG. 1 an exemplary polymerization and branching sequence, in embodiments, of the present invention, wherein a mixture of a free radical initiator $I_2$, such as benzoyl peroxide or azobisisobutyl nitrile, a free radical reactive monomer M1, such as styrene or acylic acid, and a stable free radical agent T•, such as a sterically hindered nitroxide radical compound, are heated to produce the linear or unbranched polymer product I—$(M1)_m$—T, where m is an integer and represents the number of monomers polymerized. In a second step, a monofunctional branching agent B and the unbranched polymer product are heated to incorporate the branching agent into the polymer product, that is, inserted between the terminal monomer and the stable free radical end group, to form a still unbranched polymer product of the formula I—$(M1)_m$—$(B)_n$—T where n is an integer and represents the number of branching agents polymerized or inserted at the end of the polymer chain. Next, the unbranched polymer containing branching agent monomers is irradiated in the presence of a second stable free radical agent T•' to selectively cleave the branching agent so that a free radical species associated with the polymer is generated and thereby creates a branch point, and which free radical species is rapidly trapped by the stable free radical agent T•' to afford a branched polymer product of the formula I—$(M1)_m$—[B—T']$_n$—T. The branched polymer product is thereafter heated in the presence of a second monomer M2 which is added to the polymer, or inserted between, at substantially all sites having a covalently bonded stable free radical agent, —T and —T', to afford a branched polymer product with polymer chain extensions consisting of M2 monomers of the formula I—$(M1)_m$—[B—$(M2)_o$—T']$_n$—$(M2)_o$—T, wherein o is an integer and represents the number of M2 monomers added to, or incorporated within, the branched polymer product, a ratio of o/n reflects that the total amount of M2 monomer incorporated into the branched polymer product is substantially equally and uniformly distributed at the chain termini occupied by the covalently bound stable free radical agents, —T and —T'. As will be readily evident to one of ordinary skill in the art upon comprehending the teachings of the present invention, when the ratio of T:T' in the polymer structure is small, for example, when a large amount of branching agent is initially selected, or by way of branching agent selection and subsequent branch elaboration, the amount or relative ratio of M2 monomer or other added monomers that are incorporated in the polymer chain at T relative to T' accordingly is also small.

Figure 2:
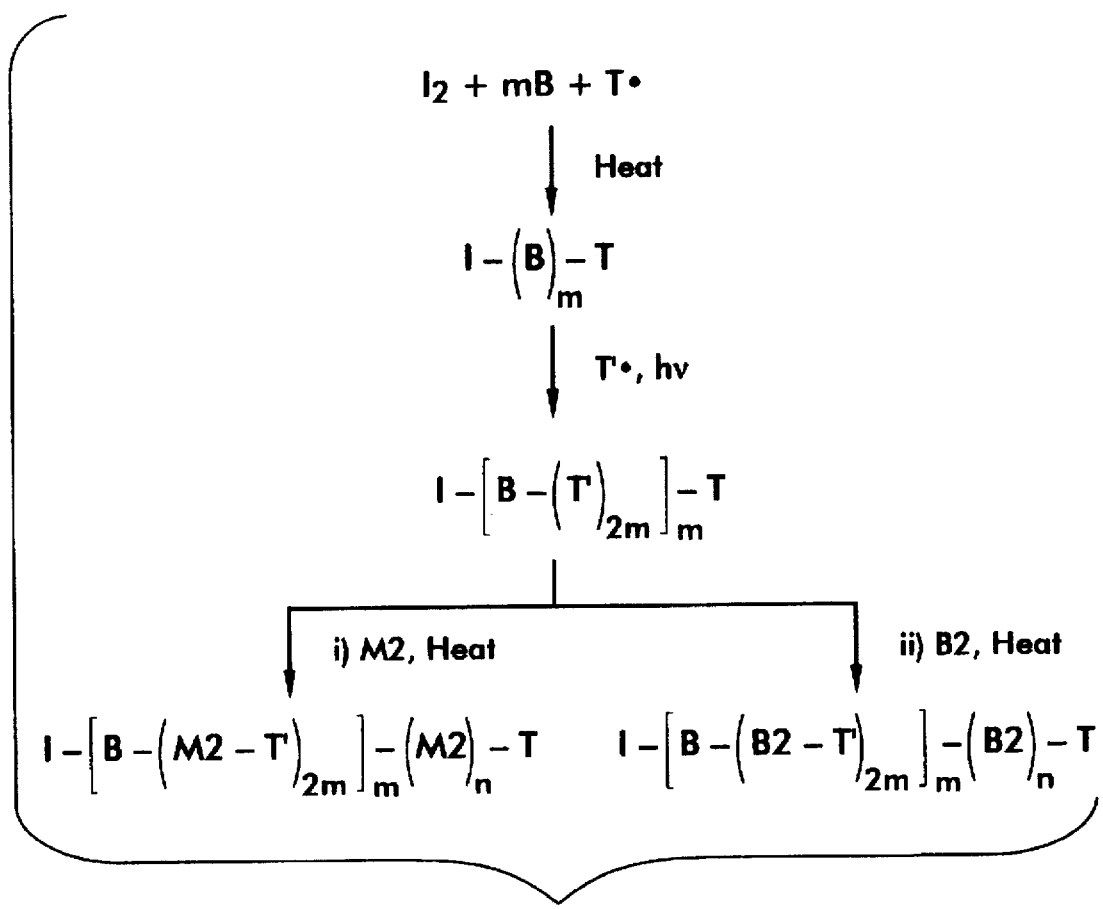
FIG. 2 is a schematic representation of an exemplary polymerization and branching sequence, in embodiments, of the present invention.

In FIG. 2 there is illustrated an exemplary polymerization and branching sequence, in embodiments of the present invention, wherein a mixture of a free radical initiator $I_2$, such as benzoyl peroxide or azobisisobutyl nitrile, only free radical reactive difunctional branching agent monomers B, and a stable free radical agent T•, are heated to produce the linear or unbranched polymer product I—$(B)_m$—T, where m is an integer and represents the relative number of branching agents polymerized. In a second step, the unbranched polymer product containing branching agent monomers of the formula I—$(B)_m$—T is irradiated in the presence of a second stable free radical agent T•' to selectively cleave the difunctional branching agents in the polymer so that a free radical species associated with the polymer are generated and thereby create a plurality of bifurcated or double branch points corresponding to approximately 2 m, that is, where there are two free radical species associated with substantially each branching agent site in the polymer, and which free radical species are rapidly trapped by stable free radical agents T•' to afford a branched polymer product of the formula formula I—[B—$(T')_{2m}$]$_m$—T. The branched polymer can thereafter be further elaborated in various ways, for example, chain extended by again applying the aforementioned stable free radical mediated polymerization principles, or further branched by applying the branching sequence of the present invention, by heating with one or more free radical reactive momomers M2, or a second free radical reactive branching agent B2, such that branched polymer of the formulas, I—[B—(M2—T')$_{2m}$]$_m$—$(M2)_m$—T, and I—[B—(B2—T')$_{2m}$]$_m$—$(B2)_n$—T, respectively, are prepared, wherein n indicates the relative amount of the last added monomer or branching agent which is inserted between the polymer chain end and the first added stable free radical terminal group T.

In other embodiments of the present, it is possible to copolymerize mixtures of mono- and or difunctional free radical reactive monomers, such as clefins and dienes, with mono- or multifunctional branching agent monomers to produce various branched copolymer architectures or copolymeric segments structures which contain both monomer types. Some advantages of the aforedescribed process variant include the ability to prepare highly branched copolymedc materials, and the ability to eliminate additional, separate, or unnecessary polymerization and branch point introducing reaction steps.

Any suitable branching agent can be selected so long as the objectives of the present invention are achieved. As used herein "branching agent" refers to two related but functionally different compound classes. Each branching agent class provides an operator with unique molecular design flexibility and control over the polymer chain length and level of branching which can be achieved in a selected branching polymerization process or combined chain elongation and branching sequence.

One class of branching agent, referred to in embodiments as a "branching agent monomer", comprises compounds which are capable of sequentially undergoing or performing both thermal polymerization with a free radical species, that is, polymer chain propagation and integration into a growing polymer chain, and thereafter undergoing photochemically induced branch point formation. A branching agent monomer compound of the present invention has at least one free radical reactive and therefore polymerizable double bond, and at least one chromophore which can be selectively photochemically activated to enable the formation of at least one free radical specie which can be trapped by the presence of either a stable free radical compound, such as T'•, which leads to a reversibly terminated branch site, or a second free radical reactive monomer compound which leads to uncontrolled free radical polymerization and chain elongation in the absence of excess stable free radical trapping agent.

Another class of branching agent useful in the present invention, also referred to in embodiments as an "inhibiting branching agent", comprises compounds which are capable of sequentially inhibiting thermal polymerization, that is, polymer chain termination, and thereafter undergoing photochemically induced branch point formation. Thus, an "inhibiting branching agent" has a first function to inhibit or terminate initial polymer chain extension by terminating or irreversibly blocking further monomer addition by reacting with the propagating free radical species, and a second function to selectively allow branch point formation by of appropriate selective photochemical cleavage.

An important distinction between the aforementioned branching agent monomer compounds and an inhibiting branching agent compounds is that the branching agent monomers by definition and design provide for polymer chain propagation at branch point loci as well as polymer chain propagation at the predecessor polymer chain, that is the polymer chain which originally incorporated the branching agent. The inhibiting branching agent compounds provide for polymer chain propagation only at branch point loci and substantially limit or preclude chain propagation of the predecessor polymer chain.

In embodiments of the present invention, branching agent monomer compounds and inhibiting branching agent compounds, are preferably used separately in separate branching schemes, however they can be used together in admixtures if desired and with the understanding that the presence of the inhibiting branching agent can lead to slow reactions and long reaction periods.

In embodiments, preferred branching agent monomer compounds are, for example, olefin containing dialkyl substituted alpha hydroxy aryl ketones, wherein the olefin provides for the aforementioned predecessor polymer chain elongation, and the hydroxy aryl ketone functional grouping provides the chromophore for photochemical activation and cleavage leading to the formation of the branch point. Other example classes of branching agent monomers include bis-dialkyl substituted alpha hydroxy aryl ketones, and still other example classes include those described by S. P. Pappas "Photoinitiated Polymerization" in: Comprehensive Polymer Chemistry, The Synthesis and Characterization, Reactions and Applications of Polymers. Volume 4, Pergamon Press, Oxford, the disclosure of which is incorporated herein by reference in its entirety. These compounds can be readily functionally modified for use in the present invention by attaching a polymerizable group, such as a vinyl group, to the photoinitiator portion of the molecule. Furthermore, olefin containing acylphosphine oxides, of the general structure $R_1C(O)—P(O)R_2R_3$, where at least one R group contains a polymerizable double bond, and which compounds undergo a Norris Type I cleavage, also function as suitable branching agents in pseudoliving polymerization.

Suitable monofunctional branching agent monomer compounds B can be of the general formula

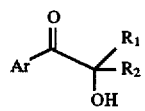

wherein Ar is an aryl group containing at least one free radical polymerizable unsaturated double bond and from 8 to about 26 carbon atoms, and $R_1$ and $R_2$ are independently selected from the group consisting of alkyl, alkylene, alkylaryl, and cycloalkyl substituents with from 1 to about 20 carbon atoms.

An exemplary branching agent monomer compound B is of the formula

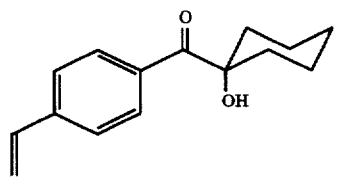

An exemplary inhibiting branching agent compound B is the disubstituted quinone compound of the formula

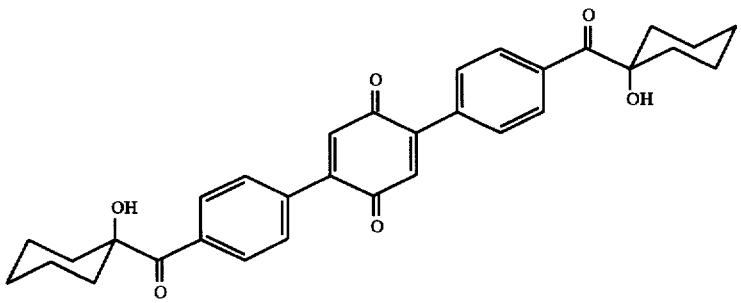

wherein the quinone portion of the molecule provides free radical chain polymerization inhibition and the hydroxy aryl ketone moieties provide the latent or masked photochemically activated branching sites.

In embodiments, processes of the present invention can further comprise combining the branched resin with, for example, a thermoplastic resin, a colorant, a charge control additive, a surfactant, an emulsifier, a pigment dispersant, and mixtures thereof, to form a subsequent mixture which can be further melt blended in a suitable melt mixing apparatus to form a toner suitable for use in xerographic and related marking applications.

In embodiments of the present invention, the initiator compound $I_2$ or A-T can have a half life of about 5 seconds to about 5 minutes at a temperature from about 80° C. to about 180° C.

Polymerizable monomers suitable for use in the present invention, in embodiments, include any free radical reactive unsaturated compounds, such as styrenes, conjugated dienes, acrylate esters and alkyl acrylate esters with from 5 to 25 carbon atoms, N-vinyl acetates amine, carboxyl, aldehyde, alkyl, cyano, and hydroxyl substituted acrylic acids and acrylic acid esters having from 2 to about 20 carbon atoms; acrylamide; methacrylamide; acrylic acid; methacrylic acid; acrolein; dimethylaminoacrylate; hydroxy-lower alkyl, and amino-lower alkyl acrylates of the formula $CH2=C(-R^1)-(C=Z)-R^2$ where $R^1$ is hydrogen, $R^2$ is selected from the group consisting of $-OR^1$ and $-NR^1_2$, and wherein Z is selected from the group consisting of oxygen and sulfur atoms. In embodiments, from 1 to about 10 different free radical polymerizable monomers can be selected and simultaneously polymerized in any one monomer addition polymerization step.

In embodiments of the present invention, the polydispersity of the arms or branches is narrow and generally is from about 1.0 to about 1.7, while the monomer to polymer conversions typically range of from about 10 to about 100 percent depending upon polymerization and branching conditions selected; the extent to which the steps in the branching process are completed; and the number of times the branching sequence is successively repeated.

The heating conditions selected for accomplishing the stable free radical mediated monomer addition polymerization can be for a period of time of from about 30 minutes to about 60 hours and at a temperature of from about 70° to about 250° C. Upon completion of a monomer addition polymerization into the chain ends, the reaction mixture is preferably cooled to below about 80° to 100° C. and preferably below about 40° C. to temporarily or permanently suspend the monomer addition polymerization process.

The weight average molecular weight ($M_w$) of the resulting arms or branches which have been appended to the branch points are, for example, independently from about 2,000 to about 200,000, and depend upon the conditions selected and the extent of repetition of the branching sequence.

The present invention provides stable free radical mediated polymerization processes for preparing branched polymers, such as denddmeric thermoplastic resins or elastomeric materials with well defined molecular structure, molecular weight properties, and narrow polydispersities. The processes can be run as batch, semi-continuous, continuous processes, or combinations thereof. The processes can be carried out in solution, bulk, suspension, emulsion, phase transfer, and extrusion reaction conditions. The processes provide for from about 1 to about 99 percent by weight of the reaction mixture to be a free radical reactive monomer or monomer mixtures and the thermally controlled chain elongation polymerization processes can be conducted at from about 100° C. to about 250° C. The processes produce branched polymer products which have: operator selectable low, intermediate, or high molecular weight; well defined branching properties including the branching number and the extent of branching; narrow polydispersity; low residual salt content or are salt free; and can have low toxicity.

Suitable stable free radical compounds for use in the present are known, and can be prepared prior to mixing with the other polymerization reactants or they may be generated in situ or on an as needed basis, reference for example, the aforementioned copending application U.S. Ser. No. 08/345,371 wherein a hindered secondary amine is converted in situ into a nitroxyl compound prior to stable free radical polymerization, and the non-nitroxyl type stable free radical compounds described in "Free Radicals" Volumes I and II, edited by J. K. Kochi, Wiley-Interscience, New York, 1973, and in the aforementioned copending application U.S. Pat. No. 5,530,079.

The stable free radical agent compounds of the present invention may be generated in any suitable fashion from the corresponding non-free radical precursor, for example, thermally, chemical, electrochemically, photolytically, mechanically, and the like methods.

Examples of suitable and preferred stable free radicals are disclosed in the aforementioned U.S. Pat. No. 3,600,169 to Lawton and include: nitrogen centered stable free radical such as organic hydrazyls, verdazyls, and pyridinyl compounds; non-nitroxide oxygen centered stable free radicals such as aroxyls and the like; and carbon centered stable free radicals such as aryl alkyls and aryl cycloalkyls with the unpaired electron residing on a carbon atom in the alkyl or cycloalkyl substituents.

The stable free radical compound when covalently bound to the branched polymer product preferably has no unpaired electrons, that is, has no free radical character or free unpaired electrons.

Suitable initiators for the branching polymerization processes of the present invention are any conventional free radical initiators which have a half-life of at least 1 second at the polymerization temperature. Preferably, the initiator will have a half life of from about 10 second to about 2 hours, more preferably from about 10 seconds to about 10 minutes at the polymerization reaction temperature. These initiators include, but are not limited to oxygen, hydrogen peroxide, certain alkyl hydroperoxides, dialkyl peroxides, peresters, percarbonates, peroxides, persulfates and azo initiators. The initiators are normally used in amounts of from about 0.05 percent to about 33 percent based on the weight of total polymerizable monomer. A preferred range is from about 0.5 to about 20 percent by weight of the total polymerizable monomer. In embodiments, the molar ratio of monomer to stable free radical agent to free radical initiator compounds, such as $I_2$ or A-T, is from about 1.0:0.2:1.0 to about 20,000:2.5:1.0. Preferred free radical initiators do not react with or degrade the stable free radical compounds with the exception of the aforementioned in situ stable free radical generation resulting from the reaction of the stable free radical precursor compound with a free radical fragments species.

The free radical initiator can be any free radical polymerization initiator capable of initiating a free radical polymerization process of unsaturated monomers and or branching agent compounds, and includes peroxide initiators such as benzoyl peroxide, persulfate initiators such as potassium persulfate, azo initiators such as azobisisobutyronitrile, and the like, and those of the formula A-T, reference the aforementioned Solomon U.S. Pat. No. 4,581,429 patent. The initiator concentration employed, in embodiments, is for example, about 0.2 to about 16.0 weight percent of the total weight of monomer to be polymerized and is determined by the desired molecular weight of the resin. Generally, as the initiator concentration is decreased relative to the weight or molar equivalents of monomer used, the molecular weight or the thermoplastic resin or elastomer product increases.

Water soluble free radical initiators can be optionally employed in the processes of this invention and are those that are traditionally used in aqueous polymerization..

Preferred initiator compounds are for example: t-butyl peroxy isobutyrate (120° C.); t-butyl peroxy 2-ethylhexanoate (95° C.); t-butyl pivalate (76° C.); and t-amyl peroxy 2-ethyl hexanoate (92° C.). Particularly preferred free radical initiators are azobisalkylnitrile and diaroyl peroxide compounds. The figures in parentheses are 1 hour half-life temperatures.

In other embodiments, the polymerization processes of the present invention can be used to prepare branched block copolymers and multi-block polymers having narrow polydispersity properties wherein at least one of the blocks is optionally water soluble thereby providing, for example, a means for preparing branched surface active agents or surfactant materials having well defined polydispersity and hydrophobe-lipophobe balance (HLB) properties.

The present invention describes hydrocarbon star polymers prepared by a stable free radical mediated free radical polymerization process in which precise control over the length of the star side chains is maintained. This control provides substantial advantages in the applications of viscosity modification, matrix strengthening and thermoplastic clarity improvement since these properties depend to a substantial extent on the tertiary structure of the star polymer.

The dendrimers of the present invention can be selected as toner additives, for example, as illustrated in the documents mentioned herein. Dendrimers are known, and can be considered radially symmetrical molecules of a STARBURST™ topology comprised of an initiator core, such as nitrogen, ethylenediimine, silicon, and the like, interior layers attached to the core and comprised of, for example, three, four or more arms, each arm being composed of repeating units with the number of repeating units in each arm being considered the generation of the dendrimer, and terminal covalently bonded stable free radical functional groups, such as a nitroxyl compound attached to the outermost generation, which dendrimers having related terminal amine terminated groups are illustrated, for example, in U.S. Pat. Nos. 4,507,466; 4,631,337; 4,558,120; 4,568,737 and 4,587,329; and in D. A. Tomalia, A. M. Naylor, and W. A. Goddard III, Angewandte Chemie, Int. Ed. Engl.,29, 138 (1990), the disclosures of which are totally incorporated herein by reference. The size and shape of the STARBURST™ dendrimer molecule and the functional groups present in the dendrimer molecule can be controlled by the choice of the initiator core, the number of generations, and the choice of repeating units employed at each generation. The choice of the dendrimer components can affect the properties of the dendrimers. The initiator core type can affect the dendrimer shape producing, for example, spheroid-shaped dendrimers, cylindrical- or rod-shaped dendrimers, or ellipsoid-shaped dendrimers. Sequential building of generations determines the dimensions Of the dendrimers and the nature of its interior. Examples of core materials which have been successfully used include polyfunctional alcohols, such as pentaerythritol or tris-(hydroxymethyl)ethane, 1,1,1-tris-(4'-hydroxyphenyl)-ethane, polyfunctional amines, such as ethylene diamine, linear polyethyleneimines, and the like, carbosilanes such as tetravinylsilane as described, for example, in J. Roovers, P. M. Toporowski and L-L. Zhou, Polymer Preprints, American Chemical Society, Division of Polymer Chemistry, 33, (1), 182 (1992), and the like; polysiloxysilanes, such as those described, for example, in L. J. Mathias and T. W. Carothers, J. Am. Chem. Soc., 113, 4043 (1991), in H. Uchida, Y. Kabe, K. Yoshino, A. Kawamata, T. Tsumuraya, and S. Masamune, J. Am. Chem. Soc., 112, 7077 (1990), in A. Morikawa, M. Kakimoto, and Y. Imai, Macromolecules, 24, 3469 (1991), and the like; polyfunctional aromatic rings, such as benzoic acids, such as 3,5-diacetoxybenzoic acid, as illustrated, for example, in B. I. Voit and S. R. Turner, in Polymer Preprints, American Chemical Society, Division of Polymer Chemistry, 33, (1), 184 (1992); hyperbranched polyphenylenes such as those described by Y. H. Kim and O. W. Webster,. in J. Am. Chem. Soc., 112, 4592 (1990), hyperbranched polyarylenes, such as those described in U.S. Pat. Nos. 4,857,630 and 5,070,183 to E. I. DuPont de Nemours and Company, and the like. The chemical functionality of the repeating unit in the interior layers can include, for example, amidoamines, such as amino-ethyl acetamide, imines, such as diethylene diimine, ethers such as those obtained from materials such as, for example, 3,5-dihydroxyethyl benzyl alcohol, siloxanes, such as dimethylsiloxane, diethylsiloxane, diphenylsiloxane, and the like, carbosilanes, such as ethyl silane, and the like. The terminal functionalities include, for example, amino groups, quaternary ammonium salts, phosphonium salts, hydroxyl groups, carboxylic acid groups, carboxylates, esters, amides, phosphates, sulfonates, and the like. The synthesis of dendrimers usually occurs by a linear, convergent, or divergent aproaches. The divergent approach involves the initial reaction of a monomer with the initiator core, followed by exhaustive reaction of the resulting functional groups with a difunctional compound, such as a diamine, including, for example, ethylene diamine, to afford the next generation of reactive amino groups. Repetition of the two-step procedure leads to subsequent generations. An alternate synthetic route uses a convergent growth synthesis as described in detail in C. J. Hawker and J. M. J. Frechet, J. Am. Chem. Soc., 112, 7638 (1990), the disclosure of which is totally incorporated herein by reference. Examples of dendrimers prepared by the divergent method include STARBURST® dendrimers available from the Michigan Molecular Institute, and Dendrimer Microparticles available from Polysciences, Inc., in which the terminal functional groups are primary amino groups, and which range in average diameter of from about 10.8 Angstroms (first generation) to about 83.9 Angstroms (8th generation). Other dendrimers of interest, in embodiments, of the present invention include those as illustrated in U.S. Pat. Nos. 5,041,516; 4,857,599 and 4,694,064, the disclosures of which are totally incorporated herein by reference.

The present invention, in embodiments, enables the preparation of branched, dendrimeric and star type homopolymers, random copolymers, block and multiblock copolymers, and polymer blends, with operator selectable molecular weight, polydispersity and branching properties, and which preparation was heretofore not readily achievable in free radical, ionic, or group transfer initiated or mediated polymerization systems.

The branched polymer resins produced by processes of the present invention, in embodiments, can be, if desired, essentially monomodal, that is the molecular weight distribution is narrow and indicative of a Poisson character and without shoulders or side bands.

In embodiments, processes of the present invention provide a means for conducting pseudoliving free radical branching polymerization processes on multi kilogram or larger scales. The aforementioned embodiments, if desired, can be accomplished in a single pot reactor environment. In embodiments, polymeric chain growth proceeds by a pseudoliving mechanism and can provide dendrimer and branched polymers and resins with molecular weights from very low to very high, for example, less than about 1,000 to about 200,000 and above, while maintaining narrow molecular weight distributions or polydispersities. In embodiments, branched block and multiblock copolymers can be synthesized by the aforementioned stable free radical moderated polymerization processes wherein each block formed is well defined in length by the sequentially added and reacted monomer and or branching agents and wherein each additional block added or formed also possesses a narrow molecular weight distribution.

Free radical branching polymerization processes are known in the art and provide branched or crosslinked resins with broad polydispersities and generally high molecular weights. The present invention relates to branching polymerization processes that proceeds via a pseudoliving free radical mechanism and provide branched resins of high, intermediate, or low molecular weights and with narrow polydispersities. The present invention provides branched polymer products with a latent thermally reactive or latent functional group on at least one end or terminus of the branched polymer and which latent functional group can be used for further reaction with for example, a free radical reactive branching agent, to prepare even more highly branched or extended linear polymeric chains with complex architectures. The present invention, in embodiments, provides branching and polymerization processes that enable control of resin molecular weight, weight distribution, modality of the products, the degree and extent of branching, molecular volume, and the like properties.

The stable free radical compound or agent selected for use in the present invention may be any known stable free radical agent which enables the objects and improvements of the present invention to be achieved. The aforementioned copending applications and commonly assigned patents disclose various stable free radical agents, including 2,2,6,6-tetramethy-1-piperidinyloxy free radical (TEMPO), and related nitroxyl stable free radical compounds. The aforementioned nitroxyl stable free radical compounds, and related derivatives, while quite satisfactory for the purpose of moderating the polymerization of a wide variety of different monomer and comonomer types, these compounds were found to be less effective at either higher temperatures or in the presence of acidic promoter compounds. The reduced effectiveness of the aforementioned nitroxyl stable free radical compounds at elevated temperatures or in the presence of acidic promoter compounds is believed to be attributable to known thermal and acidic instability, respectively, of these compounds. The instability of nitroxyl stable free radical compounds is documented in, for example, L. B. Volodarsky, V. A. Reznikov, and V. I. Ovcharenko, Synthetic Chemistry of Stable Nitroxides, CRC Press, Boca Raton, Fla., 1993 and also L. Berliner, Spin Labeling Theory and Applications, Academic Press, New York, 1976. The acidic instability of the nitroxide is believed to lead to, for example, conversion of the nitroxyl free radical functionality(=N—O) to the corresponding ineffective hydroxyl amine compound (=N—OH). Thus, when thermal or acidic instability of the stable free radical compound becomes an issue, non-nitroxyl type stable free radical compounds can be selected to circumvent this problem, reference the aforementioned copending U.S. Pat. No. 5,530,079.

Although not desired to be limited by theory, it is believed that photoinitiation or photolysis of the branching agent compound or compounds produce free radical species, generally by a Norrish Type I mechanism. The resulting radicals initiate polymerization of available free radical reactive monomer(s) molecules. However, since a stable free radical such as •TEMPO is present, either the low molecular weight photoiniator fragment, or the contiguous polymer fragment, such as a short oligomer chain, are captured by excess stable free radical, to afford for example a TEMPO-polymer intermediate product. On thermolysis, the TEMPO-polymer bond ruptures to produce a radical species on the polymer chain end which subsequently captures additional monomer thereby providing a pseudoliving polymerization reaction mechanism. Any low molecular weight photoiniator fragment-TEMPO by product can be readily separated from the higher molecular weight branched polymeric product by various known methods, for example, solvent precipitation, extraction, or washing.

The branching polymerization reactions of the present invention can be accomplished in the absence of solvents or supplemented with a solvent or cosolvent if desired to help ensure that the reaction mixture or at least the monomer containing portion remains a homogeneous single phase throughout the monomer conversion. Any solvent or cosolvent may be selected so long as the solvent media is effective in providing a solvent system which avoids precipitation or phase separation of the reactants or polymer products until after all the solution polymerization reactions have been completed. Exemplary solvent or cosolvents useful in the present invention may be selected from the group consisting of polymer product compatible aliphatic alcohols, glycols, ethers, glycol ethers, pyrrolidines, N-alkyl pyrrolidinones, N-alkyl pyrrolidones, polyethylene glycols, polypropylene glycols, amides, carboxylic acids and salts thereof, esters, organosulfides, sulfoxides, sulfones, alcohol derivatives, hydroxyether derivatives such as butyl CARBITOL® or CELLOSOLVE®, amino alcohols, ketones, and the like, derivatives thereof, and mixtures thereof. Specific examples include ethylene glycol, propylene glycol, diethylene glycol, glycerine, dipropylene glycol, tetrahydrofuran, and the like, and mixtures thereof. When mixtures of water and water soluble or miscible organic liquids are selected as the reaction media, the water to cosolvent weight ratio typically ranges from about 100:0 to about 10:90, and preferably from about 97:3 to about 25:75.

The molecular weights referred to are measured by gel permeation chromatography using, for example, a polyethylene oxide standards for water soluble polymers and polystyrene standards for organic soluble polymers unless specifically stated otherwise.

During the reaction of monomer or mixtures of monomers to form polymers, the reaction time may be varied over about 30 minutes to 60 hours, preferably between about 2 to 10 hours and optimally about 3 to 7 hours. The optimal reaction time may vary depending upon the temperature, the volume and scale of the reaction, the extent and degree of branching, and the quantity and type of polymerization initiator and stable free radical agent selected.

Irradiation can be accomplished by conventional means using, for example, a conventional ultraviolet source—quartz reactor and suitable equivalents.

The molar ratio of the stable free radical (SFR) agent to free radical initiator (INIT) residing in the monomer phase can, in embodiments, be from about 0.5 to about 5.0, and preferably in the range from about 0.4 to 4.0. Although not wanting to be limited by theory, in an embodiment, the molar ratio [SFR:INIT] of stable free radical agent, for example, 2,4,6-tri-tert-butyl phenoxy radical, to free radical initiator, for example, benzoyl peroxide is about 2.0 and is believed to be important for success of the process. If the [SFR:INIT] is too high then the reaction rate is noticeably inhibited. If the [SFR:INIT] is too low then the reaction product has undesired increased polydispersity.

In embodiments, the molar ratio of monomer content to stable free radical agent to free radical initiator is from about 6.0:0.2:1 to about 10,000:2.5:1 and preferably in the range of about 125:2.0:1 to about 7,000:1.3:1, for example, as used in preparing so the aforementioned polymeric branching agents.

The amount of branching agent used in the polymerization process, specifically chain elongation or branching steps depends upon the extent of chain elongation and branching desired in the resulting polymer. In embodiments of the present invention, the molar ratio of monomer to branching agent can be in the range of from about 100:0.1 to about 0.1:100. However, it should be emphasized that the above ratios for branching agent correspond to representative and not limiting amounts and the ratios of such compounds that can be present in the reactor vessel upon commencing the stable free radical polymerization process. Other suitable ratios of monomer to branching agent include, 0.0:100, that is, where no monomer is selected and only branching agent is polymerized as illustrated in FIG. 2, particularly in path ii.), and 100:0.0, that is, where no branching agent is selected, for example, in those process steps where chain elongation with monomer only is the desired result, as for example illustrated in path I.) of the Figure. The present invention, in embodiments, comprises polymerization processes which include at least branch point introduction and formation step, and optionally at least one branch point chain elongation step.

Additionally, the polymerization reaction rate of the monomer or monomers may, in embodiments of the present invention, be accelerated and the reaction time reduced by the addition of a catalyst. For example, a catalytic amount of a protic acid, which will not also initiate cationic polymerization, may be added to the reaction mixture. For example, the protic acid may be selected from the group consisting of organic sulfonic, phosphoric and carboxylic acids, with camphorsulfonic acid being preferred. When a catalyst is incorporated into the reaction mixture, the molar ratio of multifunctional nitroxide compound to catalytic acid may be from about 0.1:1 to about 11:1, with a preferred ratio of between about 1.5:1 and about 5:1. Excessive addition of catalytic acid beyond the aforementioned amounts may cause the molecular weight distribution of the resultant polymers to broaden.

Additional optional known additives may be used in the polymerization reactions, provided they do not interfere with the objects of the present invention. Such additional additives may provide additional performance enhancements to the resulting product. Such optional additives may include, but are not limited to, colorants, lubricants, release or transfer agents, surfactants, stabilizers, defoamants, mixtures thereof and the like.

In embodiments, the thermoplastic resin polymers of the present invention are preferably polymerized in an inert atmosphere, that is, with the virtual exclusion of oxygen. Embodiments of the present invention therefore conduct the stable free radical polymerization process in an inert atmosphere, such as under an argon or nitrogen blanket.

A further discussion of reaction conditions and reactants, including suitable monomers, stable free radical agents, catalysts, etc. may be found in U.S. Pat. No. 5,322,912, the entire disclosure of which has been incorporated by reference.

Following completion or termination of the reaction, the resultant polymer and or by product oligomers can be optionally separated from the reaction mixture, and washed and dried. Subsequent processing of the thermoplastic resin polymer can then be conducted.

Alternatively, branched block copolymer resins may also be prepared whereby after each desired block has been formed a new monomer or monomers is added, without the addition of more initiator or stable free radical agent, to form a new block wherein each block component is well defined in length and has a narrow molecular weight distribution and having properties depending on the repeated sequence and the monomers chosen for incorporation. Monomers added subsequent to the formation of the first formed branched thermoplastic resin or elastomer may be water soluble or water insoluble. Judicious selection of the water solubility properties of added monomers and the resulting polymeric segment enables convenient synthetic routes to branched block and multiblock copolymers with narrow polydispersities that are useful, for example, as surfactants, resin compatibilizers, such as "molecular velcro" and the like, viscosity modifiers, emulsifiers, and the like.

The branched polymeric products of the present invention may be optionally crosslinked with, for example, known crosslinking, coupling, or curing agents such as divinyl benzene and the like, either in situ or in a separate post polymerization process step.

Additional optional known additives may be used in the polymerization reactions which do not interfere with the objects of the invention and which may provide additional performance enhancements to the resulting branched product, for example, colorants, lubricants, release or transfer agents, surfactants, stabilizers, antifoams, antioxidants, and the like.

Polymer resins possessing a discrete mixture of monomodal, that is a well defined multimodal molecular weight distribution may in embodiments thereof provide several advantages, particularly for electrophotographic toner compositions such as: melt rheology properties, including improved flow and elasticity; and improved performance properties, such as triboelectrification, admix rates, and shelf life stabilities.

In the aforementioned U.S. Pat. No. 5,322,912, there is disclosed a monomer polymerized in bulk or in the absence of a solvent or diluent, that is neat, using a mixture of styrene monomer, a free radical initiator, and a stable free radical agent at constant temperature. A plot of weight percent monomer conversion versus number average molecular weight indicates that a nearly linear relationship holds for bulk polymerization reaction media using stable free radical agent moderated processes and which relationship is believed to be operative in the present invention. Thus, the Trommsdorff effect, that is, known exothermic heating or autoacceleration of the monomer conversion reaction rate and randomization of molecular weights observed in unmoderated free radical polymerization reactions is effectively suppressed in aqueous or nonaqueous polymerization processes of the present invention even at high solids content, high conversion, and elevated temperature free radical initiated polymerization reactions.

Toner compositions can be prepared by a number of known methods, such as admixing and heating resin particles obtained with the processes of the present invention such as water soluble styrene butadiene copolymer derivatives, pigment particles such as magnetite, carbon black, or mixtures thereof, and cyan, yellow, magenta, green, brown, red, or mixtures thereof, and preferably from about 0.5 percent to about 5 percent of charge enhancing additives in a toner extrusion device, such as the ZSK53 available from Werner Pfleiderer, and removing the formed toner composition from the device. Subsequent to cooling, the toner composition is subjected to grinding utilizing, for example, a Sturtevant micronizer for the purpose of achieving toner particles with a volume median diameter of less than about 25 microns, and preferably of from about 6 to about 12 microns, which diameters are determined by a Coulter Counter. Subsequently, the toner compositions can be classified utilizing, for example, a Donaldson Model B classifier for the purpose of removing toner fines, that is toner particles less than about 4 microns volume median diameter.

Illustrative examples of resins suitable for toner and developer compositions or as supplements thereto, of the present invention include branched materials prepared in accordance with the present invention and non branched materials, for example, styrene acrylates, styrene methacrylates, styrene butadienes, vinyl resins, including branched homopolymers and copolymers of two or more vinyl monomers; vinyl monomers include styrene, p-chlorostyrene, butadiene, isoprene, and myrcene; vinyl esters like esters of monocarboxylic acids including methyl acrylate, ethyl acrylate, n-butyl acrylate, isobutyl acrylate, dodecyl acrylate, n-octyl acrylate, phenyl acrylate, methyl methacrylate, ethyl methacrylate, and butyl methacrylate; acrylonitrile, methacrylonitrile, acrylamide; and the like. Preferred toner resins include styrene butadiene copolymers, mixtures thereof, and the like. Other preferred toner resins include styrene/n-butyl acrylate copolymers, PLIOLITES®; suspension polymerized styrene butadienes, reference U.S. Pat. No. 4,558,108, the disclosure of which is totally incorporated herein by reference.

In toner compositions, the resin particles are present in a sufficient but effective amount, for example from about 70 to about 90 weight percent. Thus, when 1 percent by weight of the charge enhancing additive is present, and 10 percent by weight of pigment or colorant, such as carbon black, is contained therein, about 89 percent by weight of resin is selected. Also, the charge enhancing additive may be coated on the pigment particle. When used as a coating, the charge enhancing additive is present in an amount of from about 0.1 weight percent to about 5 weight percent, and preferably from about 0.3 weight percent to about 1 weight percent.

Numerous well known suitable pigments or dyes can be selected as the colorant for the toner particles including, for example, carbon black like REGAL 330®, nigrosine dye, aniline blue, magnetite, or mixtures thereof. The pigment, which is preferably carbon black, should be present in a sufficient amount to render the toner composition highly colored. Generally, the pigment particles are present in amounts of from about 1 percent by weight to about 20 percent by weight, and preferably from about 2 to about 10 weight percent based on the total weight of the toner composition; however, lesser or greater amounts of pigment particles can be selected.

When the pigment particles are comprised of magnetites, thereby enabling single component toners in some instances, which magnetites are a mixture of iron oxides ($FeO \cdot Fe_2O_3$) including those commercially available as MAPICO BLACK®, they are present in the toner composition in an amount of from about 10 percent by weight to about 70 percent by weight, and preferably in an amount of from about 10 percent by weight to about 50 percent by weight. Mixtures of carbon black and magnetite with from about 1 to about 15 weight percent of carbon black, and preferably from about 2 to about 6 weight percent of carbon black, and magnetite, such as MAPICO BLACK®, in an amount of, for example, from about 5 to about 60, and preferably from about 10 to about 50 weight percent can be selected.

There can also be blended with the toner compositions of the present invention external additive particles including flow aid additives, which additives are usually present on the surface thereof. Examples of these additives include colloidal silicas, such as AEROSIL®, metal salts and metal salts of fatty acids inclusive of zinc stearate, aluminum oxides, cerium oxides, and mixtures thereof, which additives are generally present in an amount of from about 0.1 percent by weight to about 5 percent by weight, and preferably in an amount of from about 0.1 percent by weight to about 1 percent by weight. Several of the aforementioned additives are illustrated in U.S. Pat. Nos. 3,590,000 and 3,800,588, the disclosures of which are totally incorporated herein by reference. The branch thermoplastic resins prepared in accordance with the present invention can, in embodiments, by used as toner surface and charge additives, and which application is known in the art, reference for example, U.S. Patents assigned to E. I. DuPont Co. relating to star polymers and toner additives.

With further respect to the present invention, colloidal silicas, such as AEROSIL®, can be surface treated with the charge additives in an amount of from about 1 to about 30 weight percent and preferably 10 weight percent followed by the addition thereof to the toner in an amount of from 0.1 to 10 and preferably 0.1 to 1 weight percent.

Also, there can be included in the toner compositions low molecular weight waxes, such as polypropylenes and polyethylenes commercially available from Allied Chemical and Petrolite Corporation, EPOLENE N-15® commercially available from Eastman Chemical Products, Inc., VISCOL 550-P®, a low weight average molecular weight polypropylene available from Sanyo Kasei K. K., and similar materials. The commercially available polyethylenes selected have a molecular weight of from about 1,000 to about 1,500, while the commercially available polypropylenes utilized for the toner compositions are believed to have a molecular weight of from about 4,000 to about 5,000. Many of the polyethylene and polypropylene compositions useful in the present invention are illustrated in British Patent No. 1,442,835, the disclosure of which is totally incorporated herein by reference.

The low molecular weight wax materials are optionally present in the toner composition or the polymer resin beads of the present invention in various amounts, however, generally these waxes are present in the toner composition in an amount of from about 1 percent by weight to about 15 percent by weight, and preferably in an amount of from about 2 percent by weight to about 10 percent by weight and may in embodiments function as fuser roll release agents.

Encompassed within the scope of the present invention are colored toner and developer compositions comprised of toner resin particles, carrier particles, the charge enhancing additives illustrated herein, and as pigments or colorants red, blue, green, brown, magenta, cyan and/or yellow particles, as well as mixtures thereof. More specifically, with regard to the generation of color images utilizing a developer composition with charge enhancing additives, illustrative examples of magenta materials that may be selected as pigments include, for example, 2,9-dimethyl-substituted quinacridone and anthraquinone dye identified in the Color Index as CI 60710, CI Dispersed Red 15, diazo dye identified in the Color Index as CI 26050, CI Solvent Red 19, and the like. Illustrative examples of cyan materials that may be used as pigments include copper tetra-4-(octadecyl sulfonamido) phthalocyanine, X-copper phthalocyanine pigment listed in the Color Index as CI 74160, CI Pigment Blue, and Anthrathrene Blue, identified in the Color Index as CI 69810, Special Blue X?2137, and the like; while illustrative examples of yellow pigments that may be selected are diarylide yellow 3,3-dichlorobenzidene acetoacetanilides, a monoazo pigment identified in the Color Index as CI 12700, CI Solvent Yellow 16, a nitrophenyl amine sulfonamide identified in the Color Index as Foron Yellow SE/GLN, CI Dispersed Yellow 33, 2,5?dimethoxy-4-sulfonanilide phenylazo-4'-chloro-2,5-dimethoxy acetoacetanilide, and Permanent Yellow FGL. The aforementioned pigments are incorporated into the toner composition in various suitable effective amounts providing the objectives of the present invention are achieved. In one embodiment, these colored pigment particles are present in the toner composition in an amount of from about 2 percent by weight to about 15 percent by weight calculated on the weight of the toner resin particles.

For the formulation of developer compositions, there are mixed with the toner particles carrier components, particularly those that are capable of triboelectrically assuming an opposite polarity to that of the toner composition. Accordingly, the carrier particles are selected to be of a negative polarity enabling the toner particles, which are positively charged, to adhere to and surround the carrier particles. Illustrative examples of carrier particles include iron powder, steel, nickel, iron, ferrites, including copper zinc ferrites, and the like. Additionally, there can be selected as carrier particles nickel berry carriers as illustrated in U.S. Pat. No. 3,847,604, the disclosure of which is totally incorporated herein by reference. The selected carrier particles can be used with or without a coating, the coating generally containing terpolymers of styrene, methylmethacrylate, and a silane, such as triethoxy silane, reference U.S. Pat. No. 3,526,533, U.S. Pat. No. 4,937,166, and U.S. Pat. No. 4,935,326, the disclosures of which are totally incorporated herein by reference, including for example KYNAR® and polymethylmethacrylate mixtures (40/60). Coating weights can vary as indicated herein; generally, however, from about 0.3 to about 2, and preferably from about 0.5 to about 1.5 weight percent coating weight is selected.

Furthermore, the diameter of the carrier particles, preferably spherical in shape, is generally from about 50 microns to about 1,000 microns, and in embodiments about 175 microns thereby permitting them to possess sufficient density and inertia to avoid adherence to the electrostatic images during the development process. The carrier component can be mixed with the toner composition in various suitable combinations, however, best results are obtained when about 1 to 5 parts per toner to about 10 parts to about 200 parts by weight of carrier are selected.

The toner composition of the present invention can be prepared by a number of known methods as indicated herein including extrusion melt blending the toner resin particles, pigment particles or colorants, and a charge enhancing additive, followed by mechanical attrition. Other methods include those well known in the art such as spray drying, melt dispersion, emulsion aggregation, and extrusion processing. Also, as indicated herein the toner composition without the charge enhancing additive in the bulk toner can be prepared, followed by the addition of charge additive surface treated colloidal silicas.

The toner and developer compositions may be selected for use in electrostatographic imaging apparatuses containing therein conventional photoreceptors providing that they are capable of being charged positively or negatively. Thus, the toner and developer compositions can be used with layered photoreceptors that are capable of being charged negatively, such as those described in U.S. Pat. No. 4,265,990, the disclosure of which is totally incorporated herein by reference. Illustrative examples of inorganic photoreceptors that may be selected for imaging and printing processes include selenium; selenium alloys, such as selenium arsenic, selenium tellurium and the like; halogen doped selenium substances; and halogen doped selenium alloys.

The toner compositions are usually jetted and classified subsequent to preparation to enable toner particles with a preferred average diameter of from about 5 to about 25 microns, and more preferably from about 8 to about 12 microns. Also, the toner compositions preferably possess a triboelectric charge of from about 0.1 to about 2 femtocoulombs per micron as determined by the known charge spectrograph. Admix time for toners are preferably from about 5 seconds to 1 minute, and more specifically from about 5 to about 15 seconds as determined by the known charge spectrograph. These toner compositions with rapid admix characteristics enable, for example, the development of images in electrophotographic imaging apparatuses, which images have substantially no background deposits thereon, even at high toner dispensing rates in some instances, for instance exceeding 20 grams per minute; and further, such toner compositions can be selected for high speed electrophotographic apparatuses, that is those exceeding 70 copies per minute.

Also, the toner compositions prepared from resins of the present invention possess desirable narrow charge distributions, optimal charging triboelectric values, preferably of from 10 to about 40, and more preferably from about 10 to about 35 microcoulombs per gram as determined by the known Faraday Cage methods with from about 0.1 to about 5 weight percent in one embodiment of the charge enhancing additive; and rapid admix charging times as determined in the charge spectrograph of less than 15 seconds, and more preferably in some embodiments from about 1 to about 14 seconds.

The invention will further be illustrated in the following non limiting Examples, it being understood that these Examples are intended to be illustrative only and that the invention is not intended to be limited to the materials, conditions, process parameters, and the like, recited herein. Parts and percentages are by weight unless otherwise indicated.

EXAMPLES

A-T PHOTOINITIATOR PREPARATION

Photoinitiator 1-hydroxycyclohexyl phenyl ketone (1.06 g) and TEMPO (2.06 g) were dissolved in heptane (30 mL without prior deoxygenation) and subjected to UV irradiation. The light source used was a high pressure 450 W Hanovia mercury vapor lamp, which was placed in a water cooled, quartz, immersion well (Ace Glass Co.). The immersion well was placed in a 2 liter beaker containing water and the reaction sample containing the reagents in heptane was placed in the beaker in a long glass Craig tube. After 17.5 hours of irradiation, the sample was placed in a separatory funnel and extracted with a water-methanol mixture, 1:1= v:v, 4 times at 50 mL each, to remove the excess TEMPO. and the remaining heptane solution (6.0 g )and the resulting compound A-T was used directly in the next step.

LIVING POLYMERIZATION

The initiatior A-T (6.0 g) was added to a mixture of sodium styrene sulfonate (15 g), ethylene glycol (24 g), and water (16 g), and heated to 110 ° C. Alternatively, the mixture could be photolyzed to initiate polymerization. After 3 hours, ferrous sulfate heptahydrate (about 50 mg) was added to reduce any excess TEMPO which had not been removed during the aforementioned extraction procedure. Heating was continued for 18 hours. During this time, four aliquots of the reaction mixture were removed and gel permeation chromatograms(GPC) recorded. The GPC results indicated that the polymerizaton was living and that the baseline is free of any traces of dead or terminated polymer.

Table 1 shows the molecular weight change as a function of reaction aliqout. The narrowing polydispersity further supports the living nature of this polymerization.

TABLE 1

| SAMPLE | $M_n$ | $M_w$ | $M_p$ | PD |
|---|---|---|---|---|
| 1 | 40,491 | 59,224 | 59,024 | 1.453 |
| 2 | 60,696 | 100,857 | 104,955 | 1.662 |
| 3 | 15,974 | 22,862 | 21,053 | 1.431 |
| 4 | 88,540 | 139,727 | 133,298 | 1.578 |

A-T PHOTOINITIATOR PREPARATION CONTAINING BRANCHING AGENT

Photoinitiator 1-hydroxycyclohexyl 4-vinyl phenyl ketone (1.20 g) and TEMPO (2.06 g) are dissolved in heptane (30 mL without prior deoxygenation) and subjected to UV irradiation. The light source used is a high pressure 450 W Hanovia mercury vapor lamp. which is placed in a water cooled, quartz, immersion well (Ace Glass Co.). The immersion well is placed in a 2 liter beaker containing water and the reaction sample containing the reagents in heptane is placed in the beaker in a long glass tube. After 17.5 hours of irradiation, the sample is placed in a separatory funnel and extracted with a water-methanol mixture 1:1=v:v , 4 times at 50 mL each, to remove the excess TEMPO• and the remaining heptane solution (6.0 g)and the resulting compound A-T is used directly for chain extension or branching.

EXAMPLE I

PREPARATION OF BRANCHED POLYMERS

For branched polymers, various amounts of a co-monomer containing a photolyzable or photolablie group, such as the aforementioned alpha hydroxy ketones, is incorporated into the backbone of the polymer or oligomer. On cooling to room temperature and photolysis, in the presence of a stable free radical compound such as TEMPO., each photolyzable group of the covalently bound branching agent becomes a TEMPO terminated branch point capable of thermally induced stable free radical cleavage and subsequent stable free radical mediated monomer polymerization and narrow polydispersity chain growth. By products such as monomeric TEMPO terminated photolysis products can be readily removed from the polymer so that no new chains grow as a result of their photolysis and propagation.

EXAMPLE II

PREPARATION OF STAR POLYMERS

For the preparation of star polymers, a small amount of an initiator compound A-T containing a photolyzable group, such as the aforementioned disubstituted quirtone compound, is incorporated into the polymer chain backbone by thermally controlled copolymerization with monomers. On cooling, for example, to room temperature and photolysis, and in the presence of TEMPO• or similar stable free radical compound, each photolyzable group becomes a TEMPO terminated star point which is capable of subsequent to thermal or photochemical induced stable free radical living polymerization processes. The process of sequential chain growth or elongation, and chain branching, can be repeated many times to provide dendritic structures.

EXAMPLE III

MAGNETIC TONER PREPARATION AND EVALUATION

The polymer resin (74 weight percent of the total mixture) obtained by the stable free radical polymerization processes described in Example II may be melt extruded with 10 weight percent of REGAL 330® carbon black and 16 weight percent of MAPICO BLACK® magnetite at 120° C., and the extrudate pulverized in a Waring blender and jetted to 8 micron number average sized particles. A positively charging magnetic toner may be prepared by surface treating the jetted toner (2 grams) with 0.12 gram of a 1:1 weight ratio of AEROSIL R972® (Degussa) and TP-302 a naphthalene sulfonate and quaternary ammonium salt (Nachem/Hodogaya SI) charge control agent.

Developer compositions may then be prepared by admixing 3.34 parts by weight of the aforementioned toner composition with 96.66 parts by weight of a carrier comprised of a steel core with a polymer mixture thereover containing 70 percent by weight of KYNAR®, a polyvinylidene fluoride, and 30 percent by weight of polymethyl methacrylate; the coating weight being about 0.9 percent. Cascade development may be used to develop a Xerox Model D photoreceptor using a "negative" target. The light exposure may be set between 5 and 10 seconds and a negative bias used to dark transfer the positive toned images from the photoreceptor to paper.

Fusing evaluations may be carried out with a Xerox Corporation 5028® soft silicone roll fuser, operated at 7.62 cm (3 inches) per second.

The minimum fix and hot offset temperatures of branched stable free radical polymerization produced polymers having narrow polydispersities as toners are expected to be improved over toners prepared from resins synthesized by a free radical polymerization process without a stable free radical agent present which afford broader polydispersities. The fuser roll temperatures may be determined using an Omega pyrometer and was checked with wax paper indicators. The degree to which a developed toner image adhered to paper after fusing is evaluated using a Scotch® tape test. The fix level is expected to be excellent and comparable to that fix obtained with toner compositions prepared from other methods for preparing toners having resins with high molecular weights and narrow polydispersities. Typically greater than 95 percent of the toner image remains fixed to the copy sheet after removing a tape strip as determined by a densitometer. Alternatively, the fixed level may be quantitated using the known crease test, reference the aforementioned U.S. Pat. No. 5,312,704.

Images may be developed in a xerographic imaging test fixture with a negatively charged layered imaging member comprised of a supporting substrate of aluminum, a photogenerating layer of trigonal selenium, and a charge transport layer of the aryl amine N,N'-diphenyl-N,N'-bis(3-methylphenyl)1,1'-biphenyl-4,4'-diamine, 45 weight percent, dispersed in 55 weight percent of the polycarbonate MAKROLON®, reference U.S. Pat. No. 4,265,990, the disclosure of which is totally incorporated herein by reference; images for toner compositions prepared from the copolymers derived from for example, Example XI are expected to be of excellent quality with no background deposits and of high resolution over an extended number of imaging cycles exceeding, it is believed, about 75,000 imaging cycles.

Other toner compositions may be readily prepared by conventional means from the branched polymer and copolymer resins of the present invention including colored toners, single component toners, multi-component toners, toners containing special performance additives, and the like.

The branched polymers and copolymers of the present invention find utility in a wide variety of applications such as the improvement of the rheological properties of thermoplastic resins by blending in polystyrene star polymers, improving the compatibility of polymer blend by adding small amounts of the branched polymers as compatilizing agents, improving the viscosity index of lubricating oils, the use of these materials as a diapersant and improving the impact strength of polyphenylene ether resins. The branched polymeric products of the present invention may contain various polymeric segments such as homopolymers, random copolymers, diblock copolymers, multiblock copolymers, tapered copolymers, and combinations thereof.

The stable free radical agent moderated homopolymer and copolymer branching polymerization processes of the present invention may be applied to a wide range of organic monomers to provide novel toner resin materials with desirable electrophotographic properties. For example, branching block copolymers have application as dispersants for photoreceptor pigments. Branched multimodal resins have application to low melt resins and certain monomodal resins may be used to modify the surface of carbon black and pigment particles to make the pigment particles more miscible with a host polymer or dispersing medium. Narrow molecular weight branched resins such as poly(n-butyl acrylate)-branched-poly(styrene butadiene) find applications as improved toner resins for general application, and as "molecular velcro" compatibilizer compounds.

The aforementioned patents and publications are incorporated by reference herein in their entirety.

Other modifications of the present invention may occur to those skilled in the art based upon a review of the present application and these modifications, including equivalents thereof, are intended to be included within the scope of the present invention.

What is claimed is:

1. A process for the preparation of branched thermoplastic resins comprising:

heating a mixture comprising an initiator compound of the formula A-T, wherein A represents a group having at least one carbon atom and is such that a free radical A• arising therefrom is capable of polymerizing an unsaturated monomer by free radical polymerization and the radical functionality resides on at least one carbon atom, and T is a covalently bonded stable free radical compound, at least one free radical polymerizable monomer of the formula M1, and at least one free radical reactive branching agent of the formula B, wherein the branching agent is selected from branching agent monomers which contain a free radical reactive double bond and a photochemically active chromophore, and inhibiting branching agents which inhibit/thermal polymerization and which undergo photochemically induced branch point formation, to form an unbranched polymeric product of the formula

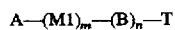

where m and n are integers from 1 to about 10,000 representing the total number of monomers M and B contained in the unbranched product;

irradiating a mixture of the unbranched polymeric product and a second stable free radical compound of the formula T• to form an intermediate branched polymeric product of the formula

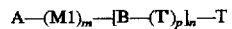

wherein a T• becomes convalently bonded to at least one branching agent B in the polymeric product, and wherein p is an integer from 1 to about 10 representing the average number of stable free radical compounds of the formula T• attached to each branching agent B in the intermediate branched polymeric product;

heating a mixture of the intermediate branched polymeric product and at least one second free radical polymerizable monomer of the formula M2 to form a first branched polymeric product of the formula

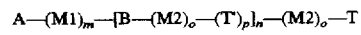

where o is an integer from 1 to about 5,000 representing the average number of monomers M2 which are inserted between each of the covalently bonded stable free radical compounds T and T' and each branch point; and cooling the mixture, wherein the resulting product is a branched thermoplastic resin with arms or branches comprised of polymerized monomer with substantially uniform length and narrow polydispersity.

2. A process in accordance with claim 1, further comprising the branching sequence of:

heating the first branched polymeric product with a second branching agent of the formula B2, to form a second intermediate product polymer;

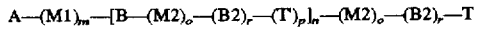

wherein r is an integer from 2 to about 200 and represents the total number second branching agent monomers B2 which are inserted between each of the covalently bonded stable free radical compounds T and T' and each branch point;

irradiating the second intermediate polymer product with at least one third stable free radical compound of the formula 7'• to from a branched polymer product of the formula

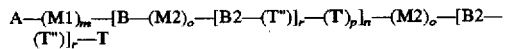

where T" is convalently bonded to the branching agents B2 in the resulting polymeric product; and heating the resulting branched polymeric product and at least one third free radical polymerizable monomer of the formula M3 to form a second branched polymer product of the formula

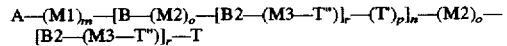

wherein the second branched polymeric product contains at least twice the number of branches as the first branched polymer product.

3. A process in accordance with claim 2, further comprising repeating the branching sequence of heating, irradiating, and heating, from 1 to about 20 times.

4. A process in accordance with claim 1, wherein branching agents contains from 1 to about 10 branching sites and wherein each branching site contains a chromophore which is photolytically active under irradiation whereby upon irradiation, a free radical species is generated at substantially each branching site and is subsequently and rapidly trapped by a stable free radical agent compound.

5. A process in accordance with claim 1, wherein branching agents contain at least one free radical polymerizable unsaturated double bond and at least one chromophore which is photolytically active when irradiated whereby at least one free radical species generated therefrom is trapped by a stable free radical agent compound.

6. A process in accordance with claim 1, wherein branching agents are selected from the group consisting of branching agent monomer compounds and inhibiting branching agent compounds, and mixtures thereof.

7. A process in accordance with claim 1, wherein the branching agent B is a branching agent monomer compound of the formula

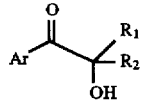

wherein Ar is an aryl group containing at least one free radical polymerizable unsaturated double bond and from 8 to about 26 carbon atoms, and $R_1$ and $R_2$ are independently selected from the group consisting of alkyl, alkylene, alkylaryl, and cycloalkyl substituents with from 1 to about 20 carbon atoms.

8. A process in accordance with claim 1, wherein the branching agent B is a branching agent monomer which is photolytically monofunctional and is of the formula

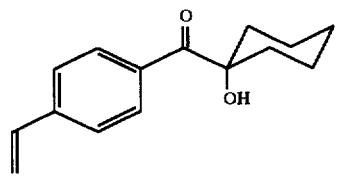

9. A process in accordance with claim 1, wherein the branching agent B is an inhibiting branching agent compound which is photolytically difunctional and is of the formula

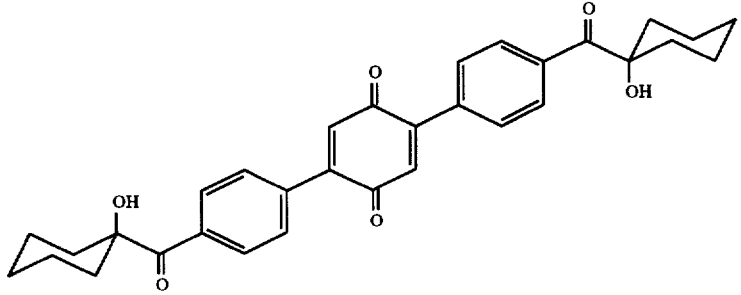

10. A process in accordance with claim 1, further comprising combining the branched resin product with at least one member selected from the group consisting of a thermoplastic resin, a colorant, a charge control additive, a surfactant, an emulsifier, and a pigment dispersant, to form a toner mixture, and wherein the mixture is further melt blended to form a melt blended toner.

11. A process in accordance with claim 1, wherein the initiator compound A-T has a half life of about 5 seconds to about 5 minutes at a temperature from about 80° C. to about 180° C.

12. A process in accordance with claim 1, wherein irradiating is accomplished with ultraviolet light.

13. A process in accordance with claim 1 wherein heating is accomplished at above about 100° C.

14. A process in accordance with claim 1 wherein the polydispersity of the arms or branches of the branched polymeric product is from about 1.0 to about 1.7 and a monomer to polymer conversion of from about 10 to about 100 percent.

15. A process in accordance with claim 1 wherein the heating is accomplished in a period of time of from about 30 minutes to about 60 hours at a temperature of from about 70° to about 250° C.

16. A process according to claim 1 wherein from 1 to about 10 different free radical polymerizable monomers are polymerized.

17. A process in accordance with claim 1 wherein the weight average molecular weight (Mw) of the arms or branches of the branched polymeric product are independently from about 2,000 to about 200,000.

18. A process in accordance with claim 1, further comprising removing intermediate by products formed in at least one step of the process.

* * * * *